(12) United States Patent
Okaue et al.

(10) Patent No.: US 6,601,140 B1
(45) Date of Patent: Jul. 29, 2003

(54) MEMORY UNIT, DATA PROCESSING UNIT, AND DATA PROCESSING METHOD USING MEMORY UNIT TYPE

(75) Inventors: Takumi Okaue, Kanagawa (JP); Akira Sassa, Saitama (JP); Nobuyuki Kihara, Tokyo (JP); Teppei Yokota, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/544,071

(22) Filed: Apr. 6, 2000

(30) Foreign Application Priority Data

Apr. 7, 1999 (JP) .......................... 11-099948
Jun. 24, 1999 (JP) .......................... 11-178188

(51) Int. Cl.$^7$ ............................ G06F 12/00
(52) U.S. Cl. .................... 711/115; 711/103
(58) Field of Search .................. 711/115, 103; 713/192, 200; 710/301

(56) References Cited

U.S. PATENT DOCUMENTS

| | | | |
|---|---|---|---|
| 5,172,338 A | * 12/1992 | Mehrotra et al. | 365/185.03 |
| 5,491,827 A | * 2/1996 | Holtey | 711/163 |
| 5,623,637 A | * 4/1997 | Jones et al. | 710/13 |
| 5,650,606 A | 7/1997 | Baus, Jr. | 235/449 |
| 5,687,346 A | * 11/1997 | Shinohara | 710/100 |
| 5,724,545 A | * 3/1998 | Skorski | 705/1 |
| 5,818,030 A | 10/1998 | Reyes | 235/492 |
| 5,852,290 A | * 12/1998 | Chaney | 235/380 |
| 5,887,145 A | * 3/1999 | Harari et al. | 710/13 |
| 5,898,884 A | * 4/1999 | Tsukamoto | 711/103 |
| 5,933,854 A | * 8/1999 | Yoshimura | 380/277 |
| 5,974,161 A | * 10/1999 | York | 235/380 |
| 6,170,743 B1 | * 1/2001 | Okaue et al. | 235/379 |
| 6,219,768 B1 | * 4/2001 | Hirabayashi et al. | 711/154 |
| 6,266,724 B1 | * 7/2001 | Harari et al. | 710/301 |
| 6,282,611 B1 | * 8/2001 | Hamamoto et al. | 711/115 |
| 6,330,634 B1 | * 12/2001 | Fuse et al. | 711/103 |
| 6,345,333 B1 | * 2/2002 | Sassa et al. | 711/103 |

FOREIGN PATENT DOCUMENTS

EP          0 802 535          10/1997          G11B/19/00

OTHER PUBLICATIONS

Harper, "Update on PCMCIA Standards Activities: CardBus and Beyond," pp 136–144, PCMCIA, 1995.*
Sternglass, "The Future is in the PC Cards," pp 46–50, IEEE, 1992.*
Lai, "Flash Memories: Where We Were and Where We Are Going," pp 971–973, IEEE, 1998.*
Iwadare et al., "Compact Multimedia Players With PC Memory Cards—Silicon View and Shopping Navigation," pp 451–456, IEEE, 1997.*

* cited by examiner

Primary Examiner—Matthew Kim
Assistant Examiner—Stephen Elmore
(74) Attorney, Agent, or Firm—Frommer Lawrence & Haug LLP; William S. Frommer; Hans R. Mahr

(57) ABSTRACT

A technique to determine whether a memory unit currently attached to a data processing unit is of a predetermined type or types. When the power of the data processing unit is turned on, it is determined whether or not a memory unit has been attached to the data processing unit. Thereafter, data is read from a boot block of the memory unit. With reference to identification information of the boot block, it is determined whether or not the attached memory unit is a first type memory unit, such as a security type memory unit. If the attached memory unit is a security type memory unit, an authenticating process is performed. After the memory unit has been authenticated, contents data may be recorded or reproduced. If the attached memory unit is not a security type memory unit, a message that represents that the memory unit cannot be used may be issued. If the data processing unit is a non-security type data processing unit, a normal operation is performed regardless of whether the memory unit attached thereto is a security type or non-security type memory unit.

15 Claims, 16 Drawing Sheets

FILE SYSTEM PROCESSING HIERARCHY

Fig. 7

| Field | | Number of Bytes | Description |
|---|---|---|---|
| MS CLASS | (*1) | 1 | 1 : TYPE-1 OTHER RESERVED |
| CARD TYPE | (*1) | 1 | 1 : READ ONLY 2: READ WRITE 3 : HYBRID OTHER RESERVED |
| BLOCK SIZE | (*1) | 2 | BLOCK SIZE IN KB 16KB : 0x0010 8KB : 0x0008 |
| NUMBER OF BLOCKS | (*1) | 2 | NUMBER OF BLOCKS |
| TOTAL NUMBER OF BLOCKS | (*1) | 2 | TOTAL NUMBER OF BLOCKS |
| PAGE SIZE | | 2 | PAGE SIZE, 512 FIXED, 0x0200 |
| SIZE OF REDUNDANT PORTION | | 1 | SIZE OF REDUNDANT PORTION =16 BYTES : 0x10 |
| SECURITY TYPE | (*1) | 1 | |
| DATE AND TIME OF ASSEMBLY | (*2) | 8 | DATE OF PRODUCTION OF CARD (HARD) (SEE DATE AND TIME DESIGNATION FORMAT ON NEXT PAGE.) |
| MAKER AREA | (*2) | 4 | USED FOR MANAGEMENT IN MAKER SUCH AS SERIAL NUMBER |
| MS ASSEMBLY MAKER CODE | (*2) | 1 | REGISTERED ASSEMBLY MAKER CODE |
| MS ASSEMBLY TYPE CODE | (*2) | 3 | REGISTERED ASSEMBLY TYPE CODE |
| MEMORY MAKER CODE | | 2 | CHIP MAKER CODE 0 : UNKNOWN |
| MEMORY DEVICE CODE | | 2 | DEVICE CODE 0 : UNKNOWN |
| MEMORY SIZE | | 2 | MB ex : 32 MBITS FLASH 0x0004 |
| FORMAT RESERVE | | 1 | 1 : OTHER RESERVED |
| FORMAT RESERVE | | 1 | 1 : OTHER RESERVED |
| VCC | | 1 | VCC UNIT : 0.1 V ex ) 3.3 V 0x21 |
| VPP | | 1 | VPP UNIT : 0.1 V ex ) 3.3 V 0x21 |
| CONTROLLER NUMBER | | 2 | CONTROLLER CHIP NUMBER |
| RESERVE | | 14 | (e.g., COMMUNICATION RATE TYPE) |
| FORMAT TYPE | (*1) | 1 | 1 : FAT OTHER RESERVED |
| APPLICATION | | 1 | 0 : GENERAL PURPOSE OTHER RESERVED |
| ZERO RESET RESERVE | | 5 | |
| RESERVE | | 35 | |

MEMORY UNIT, DATA PROCESSING UNIT, AND DATA PROCESSING METHOD USING MEMORY UNIT TYPE

BACKGROUND OF THE INVENTION

The present invention relates to a memory unit and a data processing unit and method for using a memory unit as a medium for recording, for example, audio data, the memory unit being attachable to the data processing unit and detachable therefrom.

Electrically Erasable Programmable Read-Only Memory ("EEPROM") is electrically rewritable memory that requires a relatively large physical space because each bit of memory storage is composed of two transistors. Thus, the integration of EEPROM is restricted. To address this problem, flash memory capable of storing one bit with one transistor using an all-bit-erase system was developed. Flash memory may become a successor of recording media such as magnetic disks and optical discs, and may be used in memory cards that can be freely attached to an apparatus and detached therefrom. A digital audio recorder/player may use such a memory card instead of a Compact Disc™ ("CD") or Mini Disc™ ("MD").

When an audio recorder using such a memory card employs a data compressing method that allows digital audio data to be recorded/reproduced in a relatively high quality, copyrights on music titles which can be recorded and reproduced thereby need to be protected. As an example, encrypting technologies may be used to prohibit unauthorized memory cards from such recording/reproducing. In other words, an authorized recorder/player matched with an authorized memory card are required to decrypt encrypted data. In addition to copyright protection, encrypting technologies may be used to protect the security of information stored in a memory card.

However, memory cards may not include any encrypting function. Thus, when secret data is to be recorded to such a memory card, the data is encrypted by the recorder/player before being recorded to the memory card. There are two problems with such a technique. First, if a decryption key is stored in the memory card, the security of data is not maintained. Second, if the decryption key is stored in the recorder/player, encrypted data can only be decrypted by the predetermined recorder/player that encrypted and recorded the data. Consequently, the memory card storing the encrypted data would not be compatible with other recorders/players. In other words, if data encrypted by a predetermined recorder/player is stored in a memory card, the encrypted data stored in the memory card cannot be decrypted by other recorders/players. To address this problem, a system where both a recorder/player and a memory card include an encrypting function, and where they are mutually authenticated is proposed. With such a system, both the security and compatibility of cards can be maintained.

In reality, non-copyrighted data is sometimes recorded to a memory card and reproduced therefrom. For example, when a conversation is recorded, an audio compressing method with a high compression ratio may be used, even though the decompressed audio quality would be relatively low. In such a case, it is not necessary to protect any copyrights on the recorded data. Additionally, when a memory card is used as a medium for recording a picture photographed by an electronic still camera, a video camera, or the like, it may likewise be unnecessary to protect any copyrights on the recorded video data.

A security type memory card having an encrypting function may be more expensive than a non-security type memory card. Thus, depending on the necessity for copyright protection and security, it is expected that a security type memory card and a non-security type memory card will be selectively used.

When there are two types, a security type and a non-security type, of recorders/players and memory cards, respectively, it may be necessary to determine whether each of a recorder/player and a memory card used is of the security type or the non-security type to ensure compatibility. Alternatively, the shape of a security type memory card may be different from that of a non-security type memory card. For example, a notch may be formed on a security type memory card or a non-security type memory card to prevent it from being attached to a non-security type recorder/player or a security type recorder/player, respectively.

The problem with determining compatibility between a recorder/player and a memory card is that if they are not of the same type (security or non-security), the operation would be meaningless and a delay would take place. Such a situation would be a nuisance to the user. Using different shapes for the different types of memory cards may solve this problem. However, in either case, compatibility between recorders/players and memory cards is not fully provided. For instance, a security type memory card cannot be used with a non-security type or lower grade recorder/player.

OBJECTS OF THE INVENTION

An object of the present invention is to overcome the above-described problem(s) by providing a memory unit and a data processing unit and method that can determine whether a memory unit has a predetermined function or functions that is otherwise not available.

It is another object of the present invention to provide a memory unit and a data processing unit and method that can determine whether a memory unit has a security function that is otherwise not available.

It is yet another object of the present invention to provide a memory unit and a data processing unit and method that can determine whether a memory unit has a speed function that is otherwise not available.

It is still another object of the present invention to provide a security type memory card that is compatible with a non-security type recorder/player. For example, one should be able to record a picture photographed by a non-security type handy movie camera (a recording/reproducing unit with a built-in camera) to a security type memory card and reproduce the recorded picture therefrom. In such a case, the encrypting function would not be used.

It is another object of the present invention to provide a high-speed type memory card that is compatible with a non-high-speed type recorder/player. In such a case, the high-speed function would not be used.

Other objects and advantages of the invention will in part be obvious and will in part be apparent from the specification and the drawings.

SUMMARY OF THE INVENTION

An embodiment of the present invention is a memory unit, which is attachable to/detachable from a data processing unit, having a non-volatile memory and an interface for communicating with the data processing unit; wherein identification information indicating whether the memory unit performs a predetermined function is recorded in a predetermined area of the non-volatile memory and is read by the data processing unit when the memory unit is attached to the data processing unit.

Another embodiment of the present invention is a data processing unit for recording/reproducing data to/from a memory unit—the memory unit having a non-volatile memory and being attachable to/detachable from the data processing unit—having an interface for communicating with the memory unit; wherein the data processing unit determines whether the memory unit performs a predetermined function by reading identification information recorded in a predetermined area of the memory unit.

Another embodiment of the present invention is a data processing method for use with a data processing unit for writing/reading information to/from a memory unit including: reading data from a predetermined storage area of the memory unit when the memory unit is attached to the data processing unit; and determining whether the memory unit performs a predetermined function by examining identification information stored in the predetermined area.

According to the present invention, a memory unit may have identification information which indicates whether or not the memory unit has a predetermined function recorded in a predetermined area of the memory unit. Upon attaching such a memory unit to a data processing unit, the data processing unit may read such information and determine whether the memory unit has the predetermined function.

BRIEF DESCRIPTION OF THE DRAWINGS

The above-mentioned objects, as well as additional objects, features, and advantages of the present invention will become readily apparent from the following detailed description thereof, which is to be read in conjunction with the accompanying drawings, in which:

FIG. 7 depicts the structure of boot and attribute information of a boot block of a flash memory;

DETAILED DESCRIPTION OF THE PREFERRED EMBODIMENTS

Figure 1:
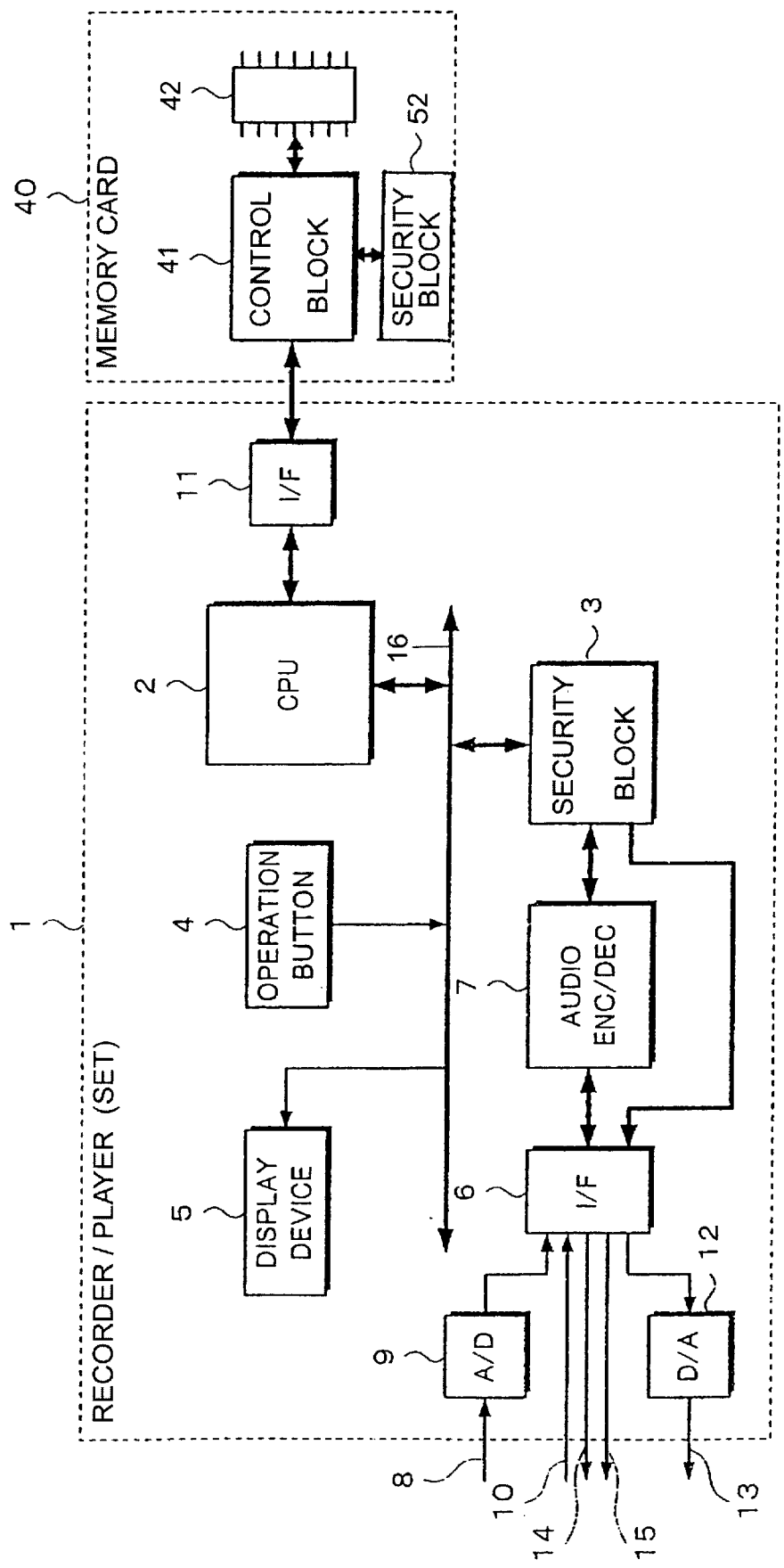
FIG. 1 depicts the overall structure of a recorder/player and a memory card in accordance with an embodiment of the present invention.

FIG. 1 is a block diagram showing the structure of a digital audio recorder/player 1 according to a preferred embodiment of the present invention. Digital audio recorder/player 1 records and reproduces a digital audio signal using a detachable memory card (or a Memory Stick™) 40. Recorder/player 1 may be a part of an audio system along with an amplifying unit (not shown), speakers (not shown), a CD player (not shown), an MD recorder (not shown), a tuner (not shown), and so forth. However, it should-be noted that the present invention may be applied to other audio sets. For instance, recorder/player I may be a portable device. The present invention may also be applied to a set top box that records digital audio data that is circulated via satellite data communication, digital broadcast, or the Internet, etc. Moreover, the present invention may be applied to a system that records/reproduces moving picture data and still picture data rather than audio data. A system according to an embodiment of the present invention may also record and reproduce additional information, such as picture and text, other than a digital audio signal.

Recorder/player 1 has a Central Processing Unit ("CPU") 2, a security block 3, an operation button 4, and a display device 5. Security block 3, operation button 4, and display device 5 are connected to CPU 2 through a bus 16. Security block 3 includes a Data Encryption Standard ("DES") encrypting circuit. Data such as a record command, a reproduction command, or the like corresponding to a user's operation of operation button 4 is supplied to CPU 2 through bus 16. Various information, the operation state of recorder/player 1, and so forth are displayed on display device 5. An audio interface 6 is disposed between an external input/output, which will be described in further detail below, and an internal audio encoder/decoder 7.

As will be described later, memory card 40 is an IC chip having a flash memory (non-volatile memory) 42, a control block 41, a security block 52 (security block 52 may include a DES encrypting circuit), a communication interface, a register, and so forth. Memory card 40 is attachable to recorder/player 1 and detachable therefrom. According to an embodiment, recorder/player 1 is also compatible with a memory card that does not have an encrypting function (namely, security block 52).

Audio encoder/decoder 7 encodes digital audio data in accordance with a highly efficient encoding method to be written to memory card 40. In addition, encoder/decoder 7 decodes encoded data read from memory card 40. The highly efficient ATRAC3 format encoding method, which is a modification of the Adaptive Transform Acoustic Coding ("ATRAC") format used for MDs, may be used.

In the ATRAC3 format, audio data sampled at 44.1 kHz and quantized with 16 bits is encoded with high efficiency. The minimum data unit of audio data for processing is a sound unit ("SU"). 1 SU contains data of 1024 samples, thus comprising (1024×16 bits×2 channels) bits, that is compressed to data of several hundred bytes. The duration of 1 SU is approximately 23 msec. Under this highly efficient encoding method, the size of compressed data is approximately 10 times smaller than that of the original data. As compared to the ATRAC1 format used in MDs, an audio signal compressed and decompressed according to the ATRAC3 format is less deteriorated in audio quality.

Illustratively, an analog input 8 supplies a reproduction output signal of an MD, a tuner, or a tape to an Analog-to-Digital ("A/D") converter 9. A/D converter 9 converts the signal from analog input 8 to a digital audio signal (sampling frequency=44.1 kHz; the number of quantizing bits=16) and supplies the converted digital audio signal to audio interface 6. A digital input 10 supplies a digital output signal of an MD, a CD, a digital broadcast signal, or network circulated audio data to audio interface 6. The digital input signal is transmitted through, for example, an optical cable. Audio interface 6 selects an input digital audio signal from A/D converter 9 and digital input 10 and supplies the selected input digital audio signal to audio encoder/decoder 7.

Audio encoder/decoder 7 encodes the input digital audio signal and supplies the encoded data to security block 3. Security block 3 encrypts the encoded data received from audio encoder/decoder 7 so as to protect copyrights on the contents of said data (in this example, a digital audio signal). Security block 3 of recorder/player 1 may have a plurality of master keys and a unit unique storage key. In addition, security block 3 may have a random number generating circuit (not shown). When memory card 40 having security block 52 is attached to recorder/player 1, security block 3 of recorder/player 1 determines whether or not memory card 40 is valid (namely, authenticates memory card 40). After security block 3 of recorder/player 1 has properly authenticated memory card 40, security block 3 of recorder/player 1 and security block 52 of memory card 40 share a session key.

The encrypted audio data that is output from security block 3 is supplied to CPU 2. CPU 2 communicates with memory card 40 through a bidirectional serial interface 11. In an embodiment, memory card 40 is attached to an attaching/detaching mechanism (not shown) of recorder/player 1. CPU 2 writes the encrypted data to flash memory 42 of memory card 40. The encrypted data is serially transmitted between CPU 2 and memory card 40.

CPU 2 reads encrypted audio data from memory card 40 through memory interface 11 and supplies such data to security block 3. Security block 3 decrypts the encrypted audio data. The decrypted audio data is supplied to audio encoder/decoder 7 which decodes the decrypted audio data, An output signal of audio encoder/decoder 7 is supplied to a D/A converter 12 through audio interface 6. D/A converter 12 converts the digital audio data into an analog audio signal and transmits the same through output 13. Audio data received from audio encoder/decoder 7 and decrypted data received from security block 3 may also be outputted as digital output signals through outputs 14 and 15, respectively, through interface 6.

Figure 2:
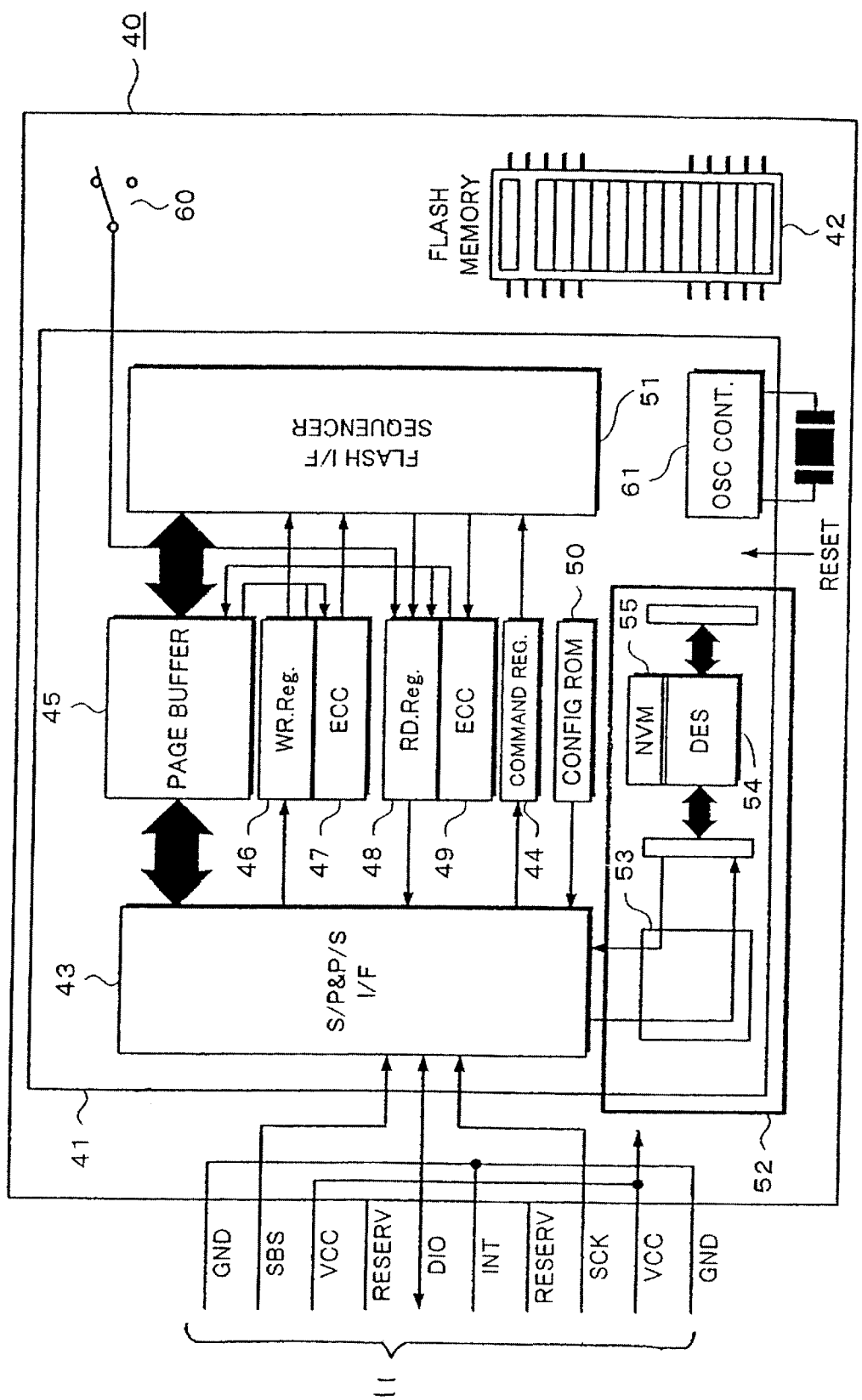
FIG. 2 depicts the internal structure of a security type memory card in accordance with an embodiment of the present invention.

FIG. 2 is a block diagram showing the internal structure of memory card 40. Memory card 40 is a one chip integrated circuit ("IC") comprising control block 41, security block 52, and flash memory 42. As shown in FIG. 2, bidirectional serial interface 11 disposed between CPU 2 of recorder/player 1 and memory card 40 is composed of 10 lines, which include a clock line SCK for transmitting the clock signal that is transmitted along with data, a status line SBS for transmitting a status signal, a data line DIO for transmitting data, an interrupt line INT, two GND lines, two VCC lines, and two reserved lines.

Four major lines of the 10 lines are clock line SCK, status line SBS, data line DIO, and interrupt line INT. Clock line SCK is used to send a clock signal to synchronize data transfer. Status line SBS is used to send a status signal that represents the status of memory card 40. Data line DIO is used to input and output a command and encrypted audio data. Interrupt line INT is used to send an interrupt request signal from memory card 40 issues to CPU 2 of recorder/player 1. When memory card 40 is attached to recorder/player 1, an interrupt signal is generated. In another embodiment, the interrupt signal is sent through data line DIO in which case interrupt line INT is grounded and not used.

A serial/parallel and parallel/serial interface block ("S/P and P/S IF block") 43 is an interface of control block 41 coupled to interface 11. S/P and P/S IF block 43 converts serial data received from recorder/player 1 into parallel data. It also converts parallel data of control block 41 into serial data, and supplies the serial data to recorder/player 1. In addition, S/P and P/S IF block 43 separates a command and data received through data line DIO into those for accessing flash memory 42 and those for performing an encrypting process.

In other words, with the data line DIO, after a command is sent, data is sent. S/P and P/S IF block 43 determines whether the received command and data are for accessing flash memory 42 or for performing the encrypting process by the code of the received command. Corresponding to the determined result, a command for accessing flash memory 42 is stored to a command register 44 and data is stored to a page buffer 45 and a write register 46. In association with write register 46, an error correction code encoding circuit 47 is disposed. Error correction code encoding circuit 47 generates a redundant code of an error correction code for data temporarily stored in page buffer 45.

Output data of command register 44, page buffer 45, write register 46, and error correction code encoding circuit 47 is supplied to a flash memory interface and sequencer ("memory IF and sequencer") 51. Memory IF and sequencer 51 is an interface coupled to flash memory 42 and controls data exchanged between flash memory 42 and control block 41, for example, data is written to flash memory 42 through memory IF and sequencer 51.

Data read from flash memory 42 is supplied to page buffer 45, a read register 48, and an error correcting circuit 49 through memory IF and sequencer 51. Error correcting circuit 49 corrects an error(s) of data stored in page buffer 45. Error corrected data output from page buffer 45 and data output from read register 48 are supplied to S/P and P/S IF block 43 and then supplied to CPU 2 of recorder/player 1 through serial interface 11.

To protect copyrights on the contents (audio data compressed in the ATRAC3 format ("ATRAC3 data")) written to flash memory 42, security block 3 of recorder/player 1 and security block 52 of memory card 40 cooperate to encrypt the contents. Security block 52 has a buffer memory 53, a DES encrypting circuit 54, a non-volatile memory 55, and so forth.

As shown in FIG. 2, a configuration ROM 50 is disposed in control block 41. Configuration ROM 50 stores version information and various kinds of attribute information of memory card 40. Memory card 40 has a write protection switch 60 operable by a user. When switch 60 is placed in a write protection position, even if recorder/player 1 sends an erase command to flash memory 42, data stored in flash memory 42 is prohibited from being erased. When switch 60 is placed in a non-write protection position, data stored in flash memory 42 is erasable. An oscillator 61 generates a clock signal used as a timing reference for processes performed in memory card 40.

Security block 52 of memory card 40 has a plurality of authentication keys and a memory card unique storage key. Non-volatile memory 55 stores a decryption or storage key that cannot be accessed from outside of security block 52. Security block 52 has a random number generating circuit. Security block 52 can authenticate recorder/player 1 (which may form a dedicated system that uses a predetermined data format) and share a session key therewith. A contents key for encrypting ATRAC3 data is encrypted with the session key and sent between recorder/player 1 and memory card 40. As with security block 52 of memory card 40, security block 3 of recorder/player 1 has a set unique storage key. When contents have been encrypted and are to be stored to flash memory 42, a corresponding contents key is encrypted using the storage key and stored with the encrypted contents.

Figure 3:
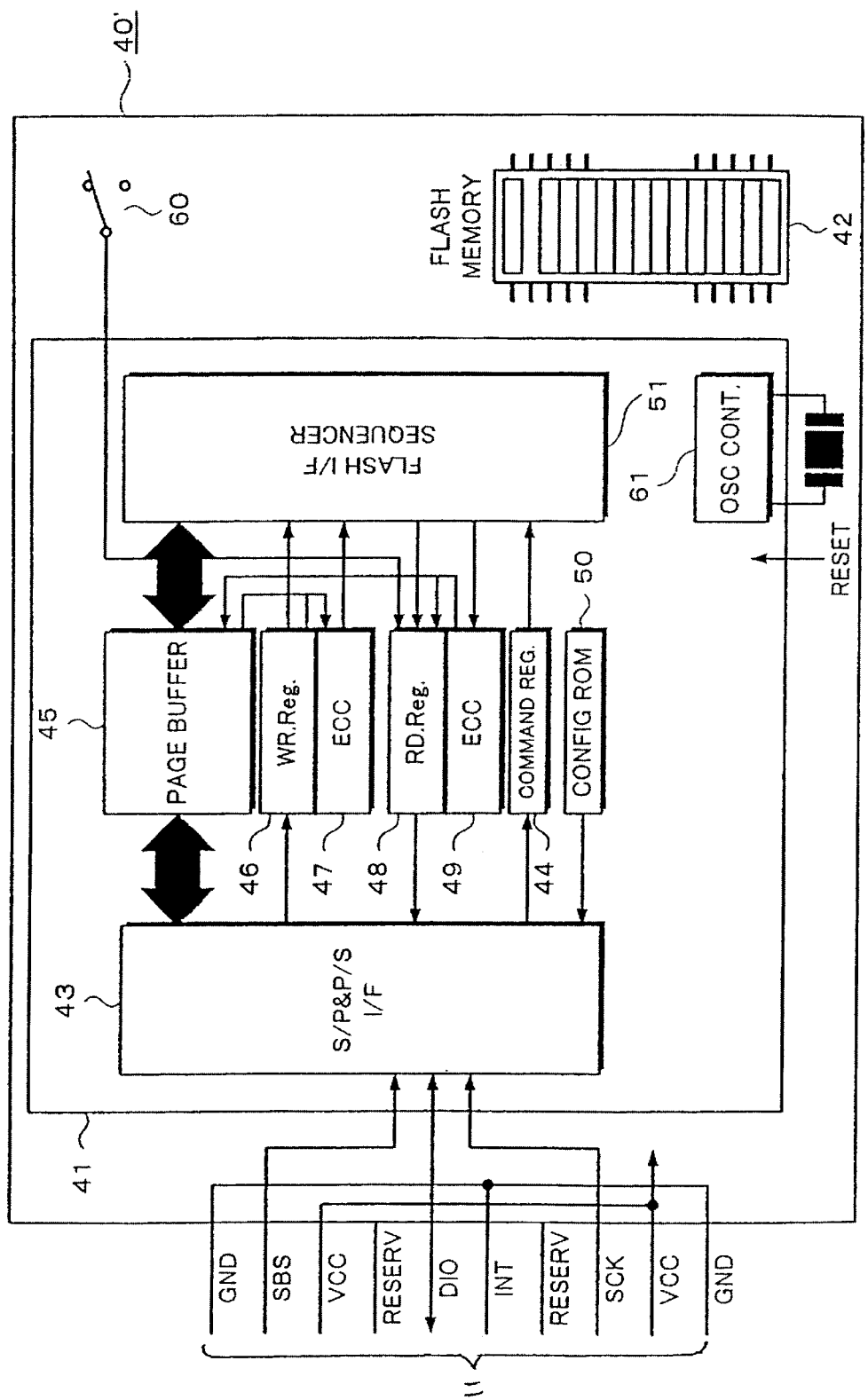
FIG. 3 depicts the internal structure of a non-security type memory card in accordance with an embodiment of the present invention.

FIG. 3 shows a memory card 40' that does not have an encrypting function. In other words, memory card 40' is a non-security type memory card. Unlike memory card 40 shown in FIG. 2, memory card 40' does not include security block 52. The remaining structure of memory card 40' is substantially the same as that of memory card 40. In addition, the size and shape of memory card 40' may be the same as that of memory card 40. Since recorder/player 1 shown in FIG. 1 is a security type recorder, recorder/player 1 and the memory card 40 are mutually authenticated and a key is communicated therebetween. When memory card 40', shown in FIG. 3, is attached to recorder/player 1, recorder/player 1 determines that memory card 40' is a non-security type memory card and that it cannot be used with recorder/player 1.

There are several methods by which recorder/player 1 may determine the type of memory card attached thereto. As one example, when memory card 40' is attached to recorder/player 1, a key is sent from recorder/player 1 to memory card 40' so as to authenticate it. Since memory card 40' does not send a correct response to recorder/player 1, recorder/player 1 determines that memory card 40' is not of the security type after a time-out period. As another example, when memory card 40 or 40' is attached to recorder/player 1, identification information that represents whether or not the memory card is of the security type may be recorded in a predetermined area (boot area) of the memory card. Upon reading such identification information, recorder/player 1 can determine the type of memory card attached thereto.

In addition to recorder/player 1 shown in FIG. 1, a unit that can use non-security type memory card 40' is presented according to the present invention. One example is a digital handy movie camera that records a picture photographed with a Charge Coupled Device ("CCD") camera to memory card 40' and reproduces the photographed picture therefrom. As will be described later, according to an embodiment of the present invention, to enhance the compatibility of memory card 40, it is structured so that a non-security device such as a digital handy movie camera can record and reproduce data using memory card 40. In other words, as described above, S/P and P/S IP block 43 has a function for separating command and data for flash memory 42 and those for security block 52.

In accordance with an embodiment, memory cards 40 and 40' store data using the File Allocation Table ("FAT") file system of a personal computer as with a disc shaped recording medium. Flash memory 42 comprises an Initial Program Load ("IPL") area, a FAT area, and a route directory. The IPL area stores the address of a program that is initially loaded to a memory of recorder/player 1. In addition, the IPL area stores various kinds of information of flash memory 42. The FAT area stores data with respect to memory blocks in flash memory 42. In other words, the FAT area stores values that represent non-used blocks, the next block number, bad blocks, and the last block. The route directory area stores a directory entry (file attribute, updated date (year, month, and day), start cluster, file size, and so forth).

In addition to the file management system defined in the format of memory cards 40 and 40', file management information (a track information management file) for a music file may be defined. The track information management file is stored in flash memory 42 using a user block of memory cards 40 and 40'. Thus, even if the FAT of memory card 40 or 40' is broken, the file can be restored.

The track information management file is created by CPU 2. When the power of recorder/player 1 is turned on, CPU 2 determines whether or not memory card 40 or 40' has been attached to recorder/player 1. When memory card 40 or 40' has been attached to recorder/player 1, CPU 2 reads a boot block of flash memory 42. In accordance with the identification information of the boot block, CPU 2 determines whether or not the attached memory card is a security type memory card.

If memory card 40 is attached (i.e., security type), CPU 2 performs an authenticating process. Other data read from memory card 40 is stored in a memory (not shown) managed by CPU 2. In flash memory 42 of memory card 40 or 40' that has not been used, before it is shipped, a FAT and a route direction are written. When data is recorded, the track information management file is created. After CPU 2 has authenticated memory card 40, recorder/player 1 records or reproduces an encrypted ATRAC3 data file.

When data is recorded, a record command that is issued corresponding to the operation of operation button 4 is sent to CPU 2. The input audio data is compressed by encoder/decoder 7. The ATRAC3 data received from encoder/decoder 7 is encrypted by security block 3. CPU 2 stores the encrypted ATRAC3 data to flash memory 42 of memory card 40. Thereafter, the FAT and the track information management file are updated. Whenever the file is updated (namely, after audio data is recorded), the FAT and the track information management file are rewritten to a memory controlled by CPU 2. When memory card 40 is detached from recorder/player 1 or the power of recorder/player 1 is turned off, the final FAT and the track information management file are supplied from the memory to flash memory 42 of memory card 40. In this case, whenever audio data has been recorded, the FAT and the track information management file stored in flash memory 42 may be rewritten. When data is edited, the contents of the track information management file are updated.

Figure 4:
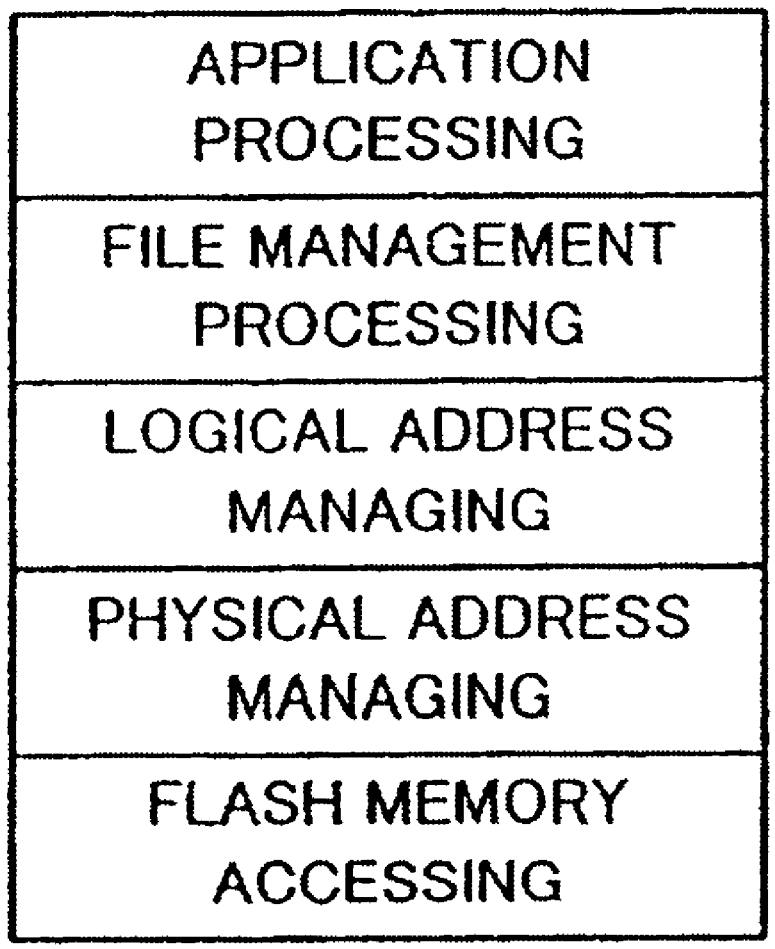
FIG. 4 depicts the structure of a file system processing hierarchy of a flash memory according to an embodiment of the present invention.

FIG. 4 is a schematic diagram showing the hierarchy of the file system processes of a computer system that uses memory card 40 or 40' as a storage medium. As shown therein, the top hierarchical level is an application process layer. The application process layer is followed by a file management process layer, a logical address management layer, a physical address management layer, and a flash memory access layer. The file management process layer is the FAT file system. Physical addresses are assigned to individual blocks of flash memory 42 in memory card 40 or 40'. The relationship between the blocks of flash memory 42 and the physical addresses thereof does not vary. Logical addresses are addresses that are logically handled on the file management process layer.

Figure 5:
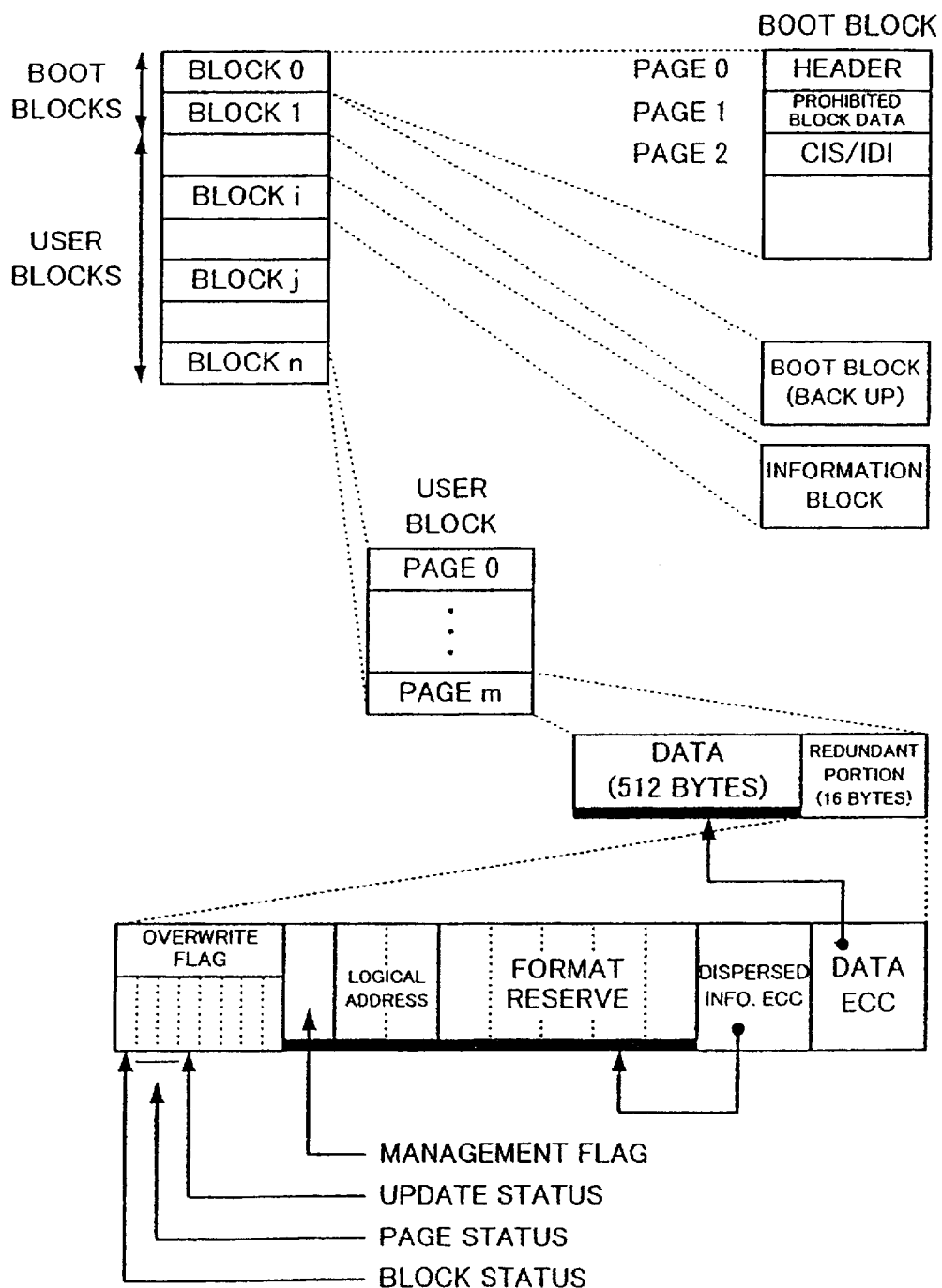
FIG. 5 illustrates a format of a physical data structure of a flash memory.

FIG. 5 is a schematic diagram showing the physical structure of data handled in flash memory 42 of memory card 40 or 40'. In flash memory 42, a data unit (referred to as a segment) is divided into a predetermined number of blocks (fixed length). One block is divided into a predetermined number of pages (fixed length). In flash memory 42, data is erased one block at a time. Data is written to flash memory 42 or read therefrom one page at a time. The size of each block is the same. Likewise, the size of each page is the same. One block is composed of page 0 to page m. One block may have a storage capacity of 8 KB (kilobytes) or 16 KB and one page may have a storage capacity of 512 B (bytes). When one block has a storage capacity of 8 KB, the total storage capacity of flash memory 42 is 4 MB (512 blocks) or 8 MB (1024 blocks). When one block has a storage capacity of 16 KB, the total storage capacity of flash memory 42 is 16 MB (1024 blocks), 32 MB (2048 blocks), or 64 MB (4096 blocks).

One page is composed of a data portion of 512 bytes and a redundant portion of 16 bytes. The first three bytes of the redundant portion is an overwrite portion that is rewritten whenever data is updated. The first three bytes successively contain a block status area, a page status area, and an update status area. The remaining 13 bytes of the redundant portion are fixed data that depends on the contents of the data portion. The 13 bytes contain a management flag area (1 byte), a logical address area (2 bytes), a format reserve area (5 bytes), a dispersion information Error-Correcting Code ("ECC") area (2 bytes), and a data ECC area (3 bytes). The dispersion information ECC area contains redundant data for an error correction process for the management flag area, the logical address area, and the format reserve area. The data ECC area contains redundant data for an error correction process for the data in the 512-byte data portion.

The management flag area contains a system flag (1: user block, 0: boot block), a conversion table flag (1: invalid, 0: table block), a copy prohibition flag (1: copy allowed, 0: copy not allowed), and an access permission flag (1: free, 0: read protect).

The first two blocks—blocks 0 and 1 are boot blocks. Block 1 is a backup of block 0. The boot blocks are top blocks that are valid in memory card 40 or 40'. When memory card 40 or 40' is attached to recorder/player 1, the boot blocks are accessed first. The remaining blocks are user blocks. Page 0 of a boot block contains a header area, a system entry area, and a boot and attribute information area. Page 1 of a boot block contains a prohibited block data area. Page 2 of a boot block contains a CIS (Card Information Structure)/IDI (Identify Drive Information) area.

Figure 6:
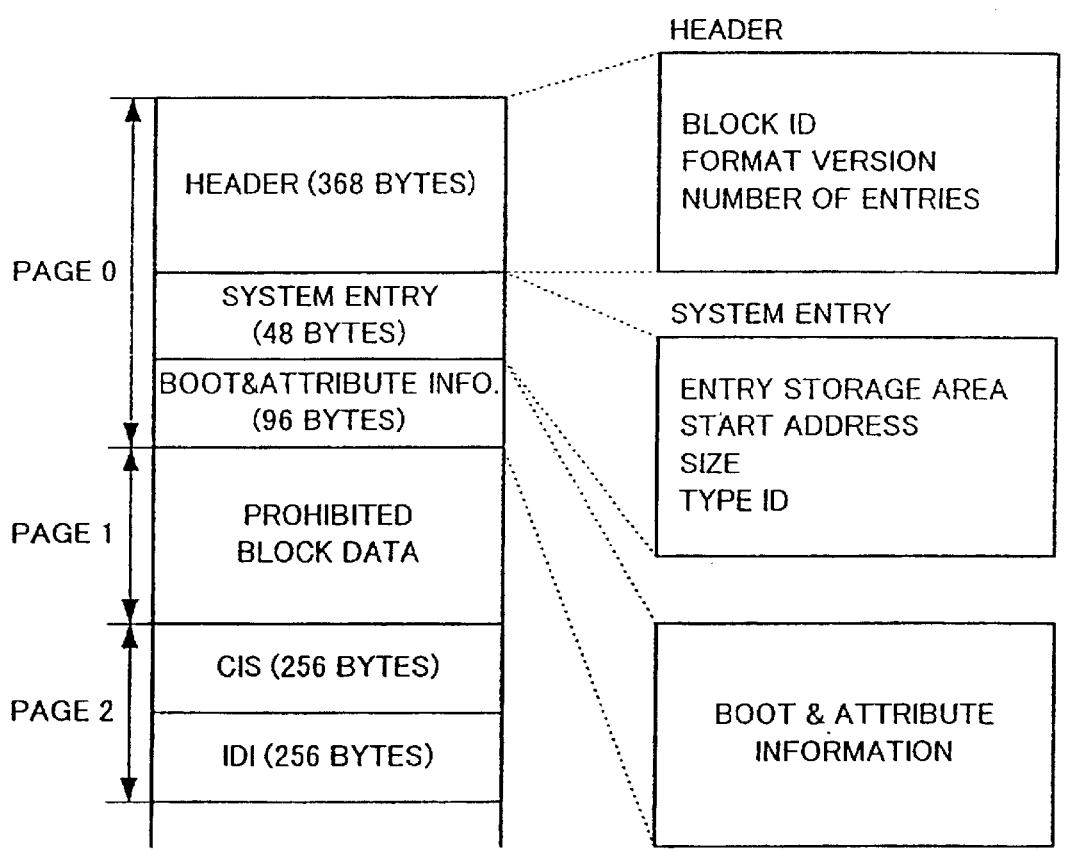
FIG. 6 depicts the structure of a boot block of a flash memory.

FIG. 6 shows the format of pages 0, 1, and 2 of a boot block. A header (368 bytes) of a boot block stores a boot block ID, a format version, and the number of valid entries of the boot block. A system entry (48 bytes) stores the start position of the prohibited block data, the data size thereof, the data type thereof, the data start position of CIS/IDI, the data size thereof, and the data type thereof. The boot and attribute information contains memory card type (read only type, rewritable type, or hybrid type), the block size, the number of blocks, the number of total blocks, the security/non-security type, the card fabrication data (date of fabrication), and so forth.

FIG. 7 shows the structure of the boot & attribute information (96 bytes) shown in FIG. 6. The boot & attribute information may include the class of the memory card, the type (read only, read write enable, hybrid of both types, etc.), the block size, the number of blocks, the total number of blocks, the security type/non-security type, the production data (the date of production: year, month, day), and so forth. In one implementation, the boot & attribute information includes the communication rate type (high speed type/low speed type), such as in one of the reserved fields shown in FIG. 7. Recorder/player 1 determines whether or not a memory card is of the security type using the security type information (one byte). In FIG. 7, (*1) represents a data item that recorder/player 1 reads and checks when a memory card is attached thereto; and (*2) represents production/quality management data item.

It is appreciated that the insulation film of flash memory 42 deteriorates whenever data stored therein is rewritten. Thus, the service life of memory card 40 or 40' is limited by the number of times flash memory 42 is rewritten. Accordingly, it is preferable to prevent a particular storage area (block) of flash memory 42 from being repeatedly accessed. Consequently, when data stored at a particular physical address is to be rewritten, updated data is not written back to the same block. Instead, the updated data is written to a block that has not been used. Thus, after data is updated, the relationship between physical addresses and logical addresses varies. When such a process (referred to as a swapping process) is performed, the same block is prevented from being repeatedly accessed. Thus, the service life of flash memory 42 can be prolonged.

Since a logical address corresponds to data written to a block, even if updated data is physically moved to another block, the same logical address may be maintained in the FAT. The swapping process causes the relationship between logical addresses and physical addresses to vary. Thus, a conversion table that converts logical addresses into physical addresses is changed accordingly when such a swapping process is performed. By referencing the conversion table, a physical address corresponding to a logical address designated by the FAT is obtained. Thus, the updated data can be properly accessed using the same logical address.

The logical address—physical address conversion table is stored in a memory Random Access Memory ("RAM") by CPU 2. However, when the storage capacity of the RAM is small, the logical address—physical address conversion table can be stored in flash memory 42. This table basically correlates logical addresses (two bytes) arranged in ascending order with physical addresses (two bytes). Since the maximum storage capacity of flash memory 42 is 128 MB (8192 blocks), with two bytes, 8192 addresses can be represented. In addition, the logical address—physical address conversion table is managed segment by segment. The size of the logical address—physical address conversion table is proportional to the storage capacity of flash memory 42. If the storage capacity of flash memory 42 is 8 MB (two segments), two pages corresponding to the two segments are used for the logical address—physical address conversion table. If the logical address—physical address conversion table is stored in flash memory 42, one bit of the management flag of the redundant portion of each page represents whether or not a relevant block has been stored in the logical address - physical address conversion table.

Figure 8A:
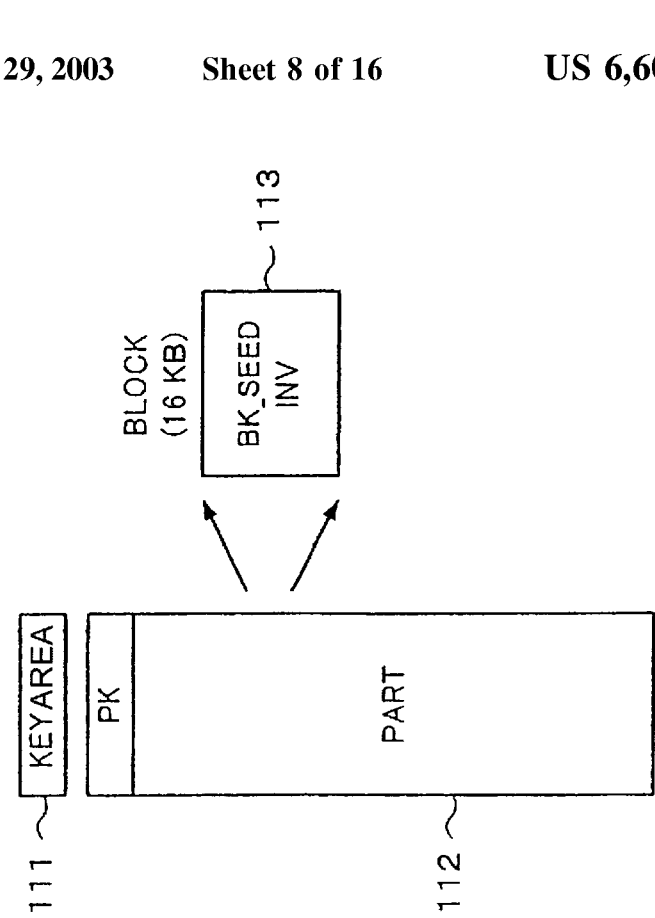
FIGS. 8A and 8B illustrate the relation between contents and a key.

Next, the security protecting function will be further described. First of all, with reference to FIGS. 8A and 8B, the relation between a key and contents will be described. Each tune (or song) stored in flash memory 42 may be referred to as a track. FIG. 8A illustrates one track stored in flash memory 42. As shown in FIG. 8A, each track includes a key area (header) 101. A contents key CK created for each track (title) of encrypted audio data is encrypted with a memory card unique storage key Kstm and the resultant data is stored to key area 101. DES is used for an encrypting process for the contents key CK and the storage key Kstm. DES (Kstm, CK) represents that the contents key CK is encrypted with the storage key Kstm. An encoded value preferably has 64 bits composed of 56 bits of data and 8 bits of an error detection by Cyclical Redundancy Checking ("CRC").

Each track is divided into parts 102. A parts key PK is recorded with each part. Illustratively,the track shown in FIG. 8A comprises only one part 102. Part 102 is a set of blocks 103 (16 KB each). Each block 103 stores a block seed BK_SEED and an initial vector INV. The part key PK is paired with a contents key CK so as to create a block key BK for encrypting the contents. In other words, BK=DES (CK (+) PK, BK_SEED) (56 bits+8 bits) (where (+) represents an exclusive-OR). The initial vector INV is an initial value for an encrypting/decrypting process for a block.

Figure 8B:
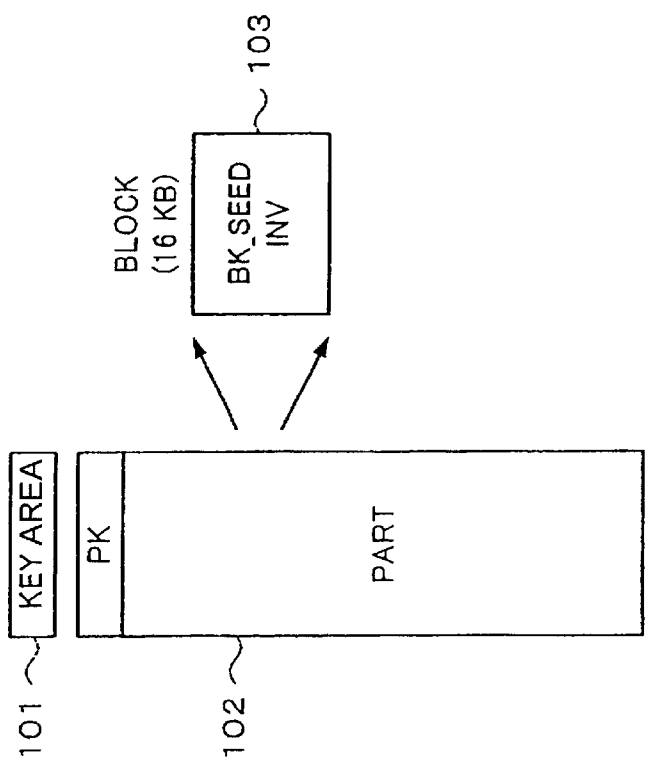

FIG. 8B relates to contents data in recorder/player 1. A contents key CK for each track of contents is decrypted and the resultant data is re-encrypted with a recorder unique storage key Kstd. The re-encrypted data is stored in a key area 111. In other words, the decrypting process is denoted by IDES (Kstm, CK) (56 bits+8 bits). The re-encrypting process is denoted by DES (Kstd, CK) (56 bits+8 bits). A part key PK for creating a block key BK is recorded for each part 112 of the contents. Each block 113 of a part 112 may store a block seed BK-SEED and an initial vector INV. As with the memory card, the block key BK is represented as BK=DES (CK (+) PK, $BK_{13}$ SEED) (56 bits+8 bits).

Write Operation to Memory Card 40

Figure 9:
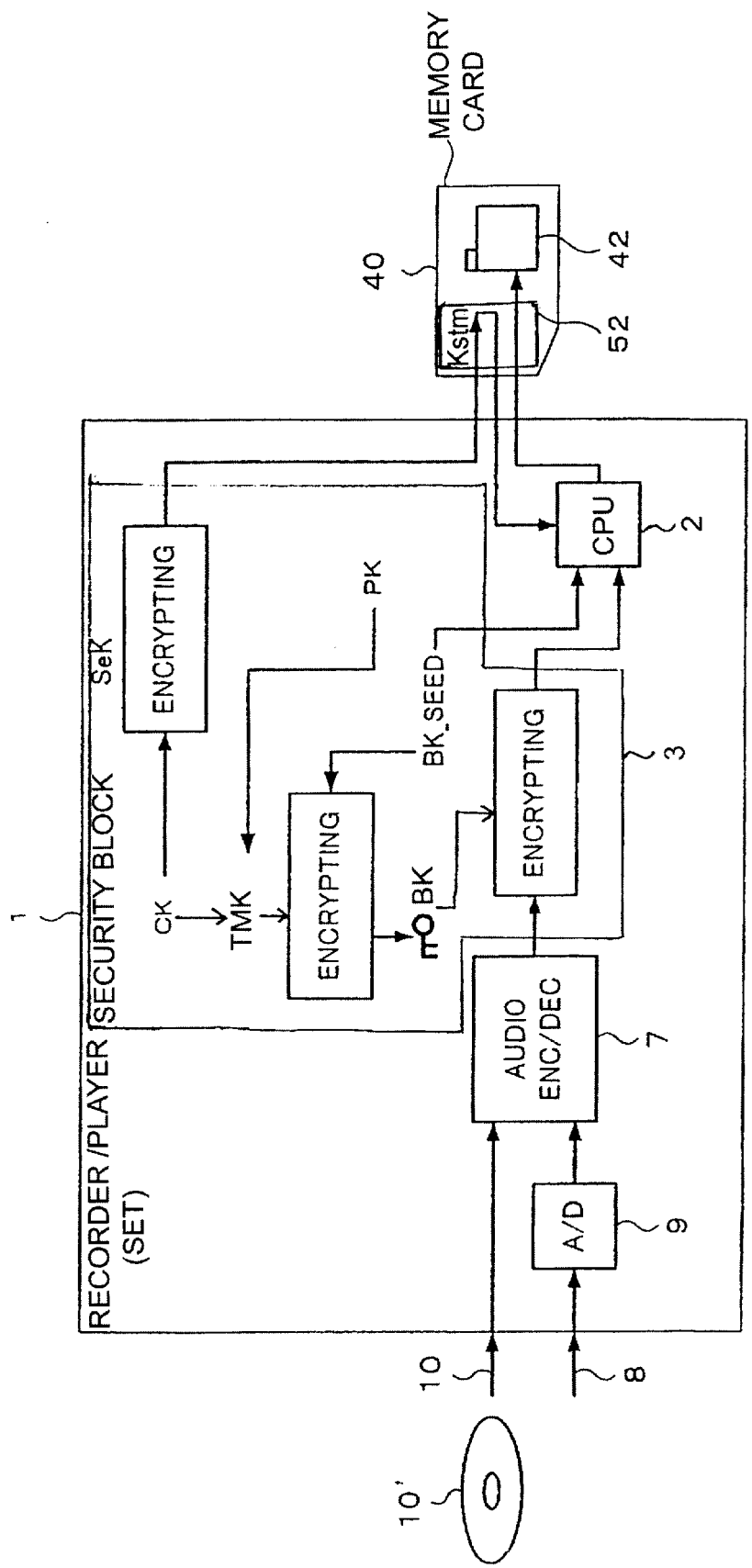
FIG. 9 is a diagram to which reference will be made in explaining an encrypting process in a record operation.

An encrypting process which may be utilized in a recording (write) operation of recorder/player 1 will now be explained with reference to FIG. 9. For simplicity, in FIG. 9, similar portions to those in FIG. 1 are denoted by similar reference numerals and their description is omitted. In addition, interface 11, bus 16, and control block 41, through which data and commands are transferred between the components of recorder/player 1 and memory card 40, have been omitted from FIG. 9 and the following process explanation for simplicity. In FIG. 9, SeK is a session key shared between recorder/player 1 and memory card 40 after they have been mutually authenticated. In FIG. 9, reference numeral 10' is a CD and a source of a digital audio signal inputted at digital input 10.

When memory card 40 is attached to recorder/player 1, recorder/player 1 determines whether or not memory card 40 is a security type memory card by use of the identification information in the boot area thereof. Since memory card 40 is a security type memory card, recorder/player 1 and memory card 40 are mutually authenticated.

The process of mutual authentication between recorder/player 1 and memory card 40 will be hereinbelow described with reference to FIG. 10.

After a write request signal is sent from recorder/player 1 to memory card 40, recorder/player 1 and memory card 40 mutually authenticate again, as will be described in further detail with reference to FIG. 10. If recorder/player 1 and memory card 40 recognize each other as legitimate in accordance with the mutual identification process, a key writing process, as will be described in further detail with reference to FIG. 1, is performed. Otherwise, the write operation is terminated. After the key writing process is complete, audio data is encrypted and written to memory card 40 through interface 11 by CPU 2.

With reference to FIG. 9, recorder/player 1 generates a random number for each track of data (tune) to be written and creates a corresponding contents key CK according to each of the random numbers. Security block 3 of recorder/player 1 encrypts contents key CK using session key SeK. Recorder/player 1 outputs the encrypted contents key CK to memory card 40. DES encrypting/decrypting circuit 54 of security block 52 in memory card 40 decrypts the encrypted contents key CK, and re-encrypts the decrypted contents key CK using a storage key Kstm from memory 55. Memory card 40 outputs the re-encrypted CK to recorder/player 1 (CPU 2). Recorder/player 1 (CPU 2) sets the re-encrypted contents key CK in the key area 111 (as shown in FIG. 8B) of each track. Recorder/player 1 generates a random number for each part data area 112 (as shown in FIG. 8B) of each track, and creates a part key PK according to each random number. Each created part key PK is set in a corresponding part data area 112 by CPU 2.

A temporary key TMK may be generated by performing an XOR of part key PK and contents key CK by recorder/player 1 for each part data area 112 as shown below in equation (1). The creation of temporary key TMK is not limited to using an XOR function. It is possible to use other functional operators, such as a simple AND operator.

$$TMK=PK \; XOR \; CK \qquad (1)$$

Recorder/player 1 generates a random number for each block 113 of each part data area 112 and creates block seed BK_SEED according to each random number. Further, recorder/player 1 (CPU 2) sets the created block seed BK_SEED into its proper position in each corresponding block 113. Recorder/player 1 uses the temporary key TMK and the block seed BK_SEED in equation (2) to perform a Message Authentication Code ("MAC") operation to create block key BK for each block 113.

$$BK=MAC \; (TMK, BK\_SEED) \qquad (2)$$

It is possible to perform processing other than a MAC operation by using a secret key on the input of a SHA-1 (secure Hash algorithm), RIPEMD-160, or other one-way Hash functions to create block key BK. Here, the one-way function f defines a function from which it is easy to calculate y=f(x) from x, but conversely difficult to find x from y. A one-way Hash function is described in detail in the "Handbook of Applied Cryptography, CRC Press".

Audio encoder/decoder 7 compresses the digital audio signal inputted to digital input 10 from CD 10' or the digital signal from A/D converter 9, which converts an analog audio signal inputted to analog input 8 into a digital signal, in accordance with the ATRAC3 format. Then, security block 3 encrypts the compressed audio data in the Cipher Block Chaining ("CBC") mode by using the block key BK, the CBC mode being a data encryption mode prescribed in Federal Information Processing Standard ("FIPS") PUB 81 ("DES MODES OF OPERATION").

Recorder/player 1 adds headers to the encrypted audio data and outputs the results to memory card 40. Memory card 40 writes the encrypted audio data and headers into flash memory 42. At this point, writing of audio data from recorder/player 1 to memory card 40 is complete.

Figure 10:
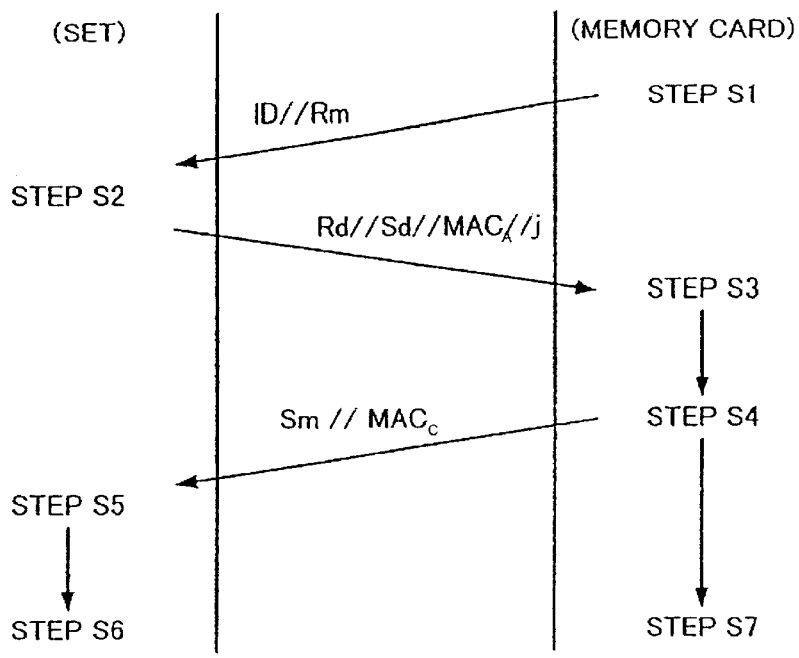
FIG. 10 is a diagram to which reference will be made in explaining an authenticating process.

FIG. 10 shows an authenticating process performed between recorder/player 1 (SET) and memory card 40 (MEMORY CARD). At step S1, the random number generator of security block 52 in memory card 40 generates a random number Rm and sends the random number Rm and the serial number ID of memory card 40 to recorder/player 1.

At step S2, recorder/player 1 receives Rm and ID and generates an authentication key IKj according to the relationship IKj=MAC (MKj, ID), where MKj is one of the master keys stored in security block 3. Recorder/player 1 generates a random number Rd and creates a message authenticator $MAC_A$ (Message Authentication Code) with the authentication key, namely, MAC(IKj, Rd//Rm//ID). Thereafter, recorder/player 1 generates a random number Sd and sends Rd//Sd//$MAC_A$//j to memory card 40.

At step S3, memory card 40 receives the data RD//Sd//$MAC_A$//j, finds an authentication key IKj from security block 52 corresponding to j, and calculates a $MAC_B$ with the authentication key IKj using Rd, Rm, and ID. When the calculated $MAC_B$ is equal to the received $MAC_A$, memory card 40 determines that recorder/player 1 is valid (i.e., authorized). At step S4, memory card 40 creates $MAC_C$= MAC(IKj, Rm//Rd) and generates a random number Sm. Thereafter, memory card 40 sends Sm//$MAC_C$ to recorder/player 1.

At step S5, recorder/player 1 receives Sm//$MAC_C$ from memory card 40. Recorder/player 1 calculates $MAC_D$ using IKj, Rm, and Rd. When the calculated $MAC_D$ is equal to the received $MAC_C$, recorder/player 1 determines that memory card 40 is valid (i.e., authorized). At step S6, recorder/player 1 designates MAC (IKj, Rm//Rd) as the session key SeK. At step S7, memory card 40 designates MAC (IKj, Rm // Rd) as the session key SeK. When recorder/player 1 and memory card 40 are mutually authenticated, the session key SeK is shared between them. The session key SeK is created whenever authentication is successful.

Figure 11:
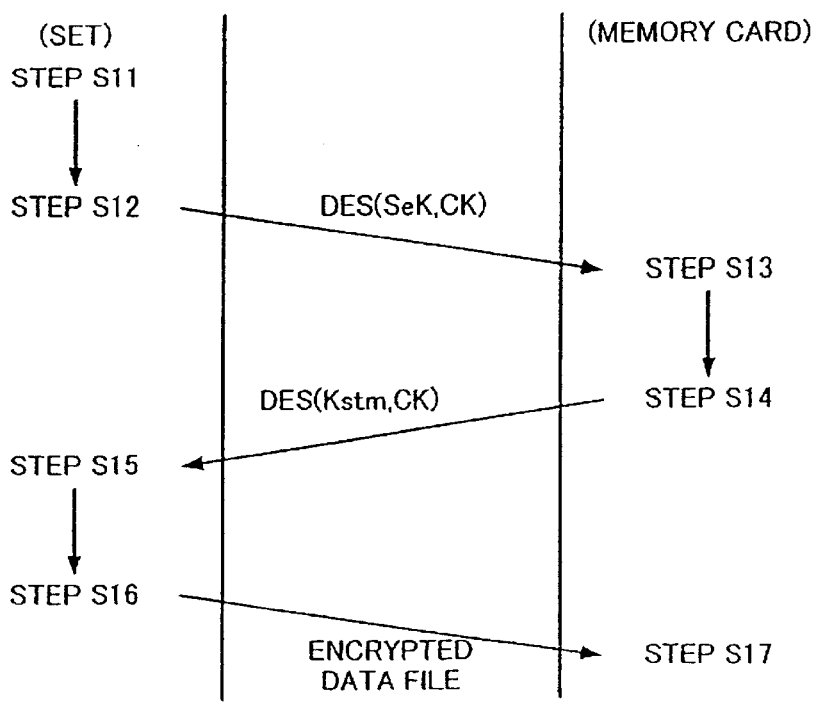
FIG. 11 is a diagram to which reference will be made in explaining an encrypting process in a record operation.

FIG. 11 shows a key writing process in the case that recorder/player 1 (SET) records audio data to flash memory 42 of memory card 40 (MEMORY CARD). At step S11, recorder/player 1 generates a random number for each track of contents and creates a contents key CK. At step S12, recorder/player 1 encrypts the contents key CK with the session key SeK and sends encrypted DES (SeK, CK) to memory card 40.

At step S13, memory card 40 receives the data DES (SeK, CK) from recorder/player 1 and decrypts the contents key CK with the session key SeK. The decrypting process is denoted by IDES (SeK, DES (SeK, CK)). At step S14, memory card 40 re-encrypts the decrypted contents key CK with the storage key Kstm from memory 55 and sends the re-encrypted contents key DES (Kstm, CK) to recorder/player 1.

At step S15, recorder/player 1 places the re-encrypted contents key CK in the key area 111 for managing the corresponding part data area 112 and performs a formatting process so that the re-encrypted contents key CK and the contents are recorded to flash memory 42 of memory card 40. To encrypt the contents, the contents key CK and the part key PK are exclusive-Ored (XOR, or alternatively, AND), as illustrated in FIG. 9 and equation 11 above. The result of the XOR operation is the temporary key TMK. The temporary key TMK is stored only in security block 3. Thus, the temporary key TMK is not accessible from outside of security block 3. At the beginning of each block 113, a random number is generated as a block seed BK_SEED. The random number is stored in each part data area 112. Recorder/player 1 encrypts the block seed BK_SEED with the temporary key TMK to obtain a block key BK. In other words, the relation of BK=(CK (+) PK, BK_SEED) is obtained. The block key BK is stored only in security block 3. Thus, the block key BK is not accessible from outside of security block 3.

At step S16, recorder/player 1 encrypts the data in each part data area 112 block by block with the block key BK and sends the encrypted data and the data in key area 111 to memory card 40. Memory card 40 records the encrypted data and the data in key area 111 (header data) received from recorder/player 1 to flash memory 42 at step S17.

Read Operation from Memory card 40

Figure 12:
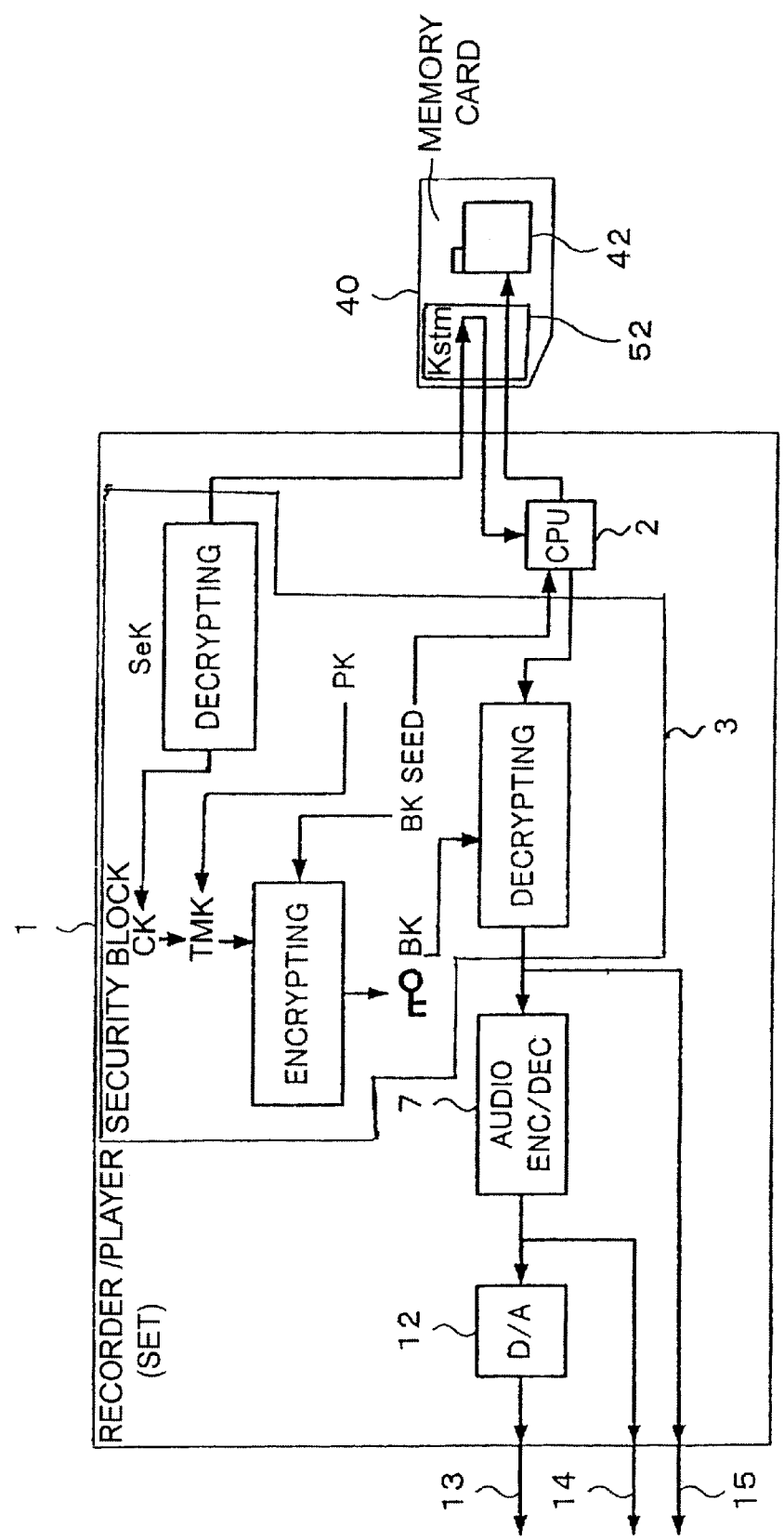
FIG. 12 is a diagram to which reference will be made in explaining an encrypting process in a reproducing operation.

A decrypting process for use in a reproducing (read) operation of recorder/player 1 will now be explained with reference to FIG. 12. For simplicity, in FIG. 12, similar portions to those in FIG. 1 are denoted by similar reference numerals and their description is omitted. In addition, interface 11, bus 16, and control block 41, through which data and commands are transferred between the components of recorder/player 1 and memory card 40, have been omitted from FIG. 12 and the following process explanation for simplicity.

A read request signal specifying a desired track of data (tune) is sent from recorder/player 1 to memory card 40. Recorder/player 1 and memory card 40 perform a mutual authentication operation, as above described with reference to FIG. 10. If recorder/player 1 and memory card 40 recognize each other as legitimate in accordance with the mutual identification process, a key writing process, as above described with reference to FIG. 11 is performed. Otherwise, the read operation is terminated. After the key writing process is complete, encrypted audio data is read from memory card 40 to recorder/player 1 by CPU 2.

Since mutual identification is carried out between memory card 40 and recorder/player 1, the encrypted contents key CK can be decrypted using the proper session key SeK only when memory card 40 and recorder/player 1 identify each other as legitimate. Therefore, illicit utilization of the audio data is easily avoided. Data read during the read operation had been written by the above-described write operation shown in FIG. 9. The setting of the contents key CK and the part key PK in each part data area 112, and the block seed BK_SEED in each block 113 is used for writing data to, and thus reading data from, the corresponding part data area 102. After step S6 of FIG. 10 is completed, memory card 40 and recorder/player 1 share session key SeK. The reading of audio data from memory card 40 proceeds as follows.

Memory card 40 specifies the data in the part data area 102 (FIG. 8A) corresponding to the read request signal and outputs the audio data in sound units SUs from the blocks 103 (FIG. 8A) in the specified part data area 102. Memory card 40 also reads the corresponding key area 101 (FIG. 8A) of the audio data and outputs it to recorder/player 1.

Recorder/player 1 picks-up the encrypted contents key CK from the data in the key area 101 and outputs it to memory card 40. DES encrypting/decrypting circuit 54 of security block 52 in memory card 40 decrypts the encrypted contents key CK using storage key Kstm stored in memory 55, and re-encrypts the decrypted contents key CK using session key SeK.

Memory card 40 outputs the re-encrypted contents key CK to recorder/player 1. Recorder/player 1 decrypts the re-encrypted contents key CK from memory card 40 using session key SeK. Recorder/player 1 then obtains the XOR of the decrypted contents key CK and the part key PK from data in each part data area 102 so as to obtain the temporary key TMK in accordance with equation (3).

$$TMK=PK\ XOR\ CK \qquad (3)$$

Recorder/player 1 uses the temporary key TMK and the block seed BK_SEED in each part data area 102 to perform the MAC operation shown in the following equation (4) so as to obtain the block key BK. The block key BK is found for every block 103 as follows.

$$BK = MAC\ (TMK, BK\_SEED) \qquad (4)$$

Security block 3 of recorder/player 1 decrypts the audio data by using the block key BK. More specifically, the audio data is decrypted for every block 103 using the individually found block key BK. Further, decryption is carried out in the same 16KB blocks 103 as used for encryption. Audio encoder/decoder 7 expands the decrypted audio data according to the ATRAC3 system and outputs the decoded signal through digital output 14 or D/A converter 12 converts the digital audio signal into an analog signal and outputs the result through analog output 13. Alternatively, the ATRAC3 audio data from security block 3 is outputted through output 15. Audio encoder/decoder 7 expands the audio data in sound units SUs.

Figure 13:
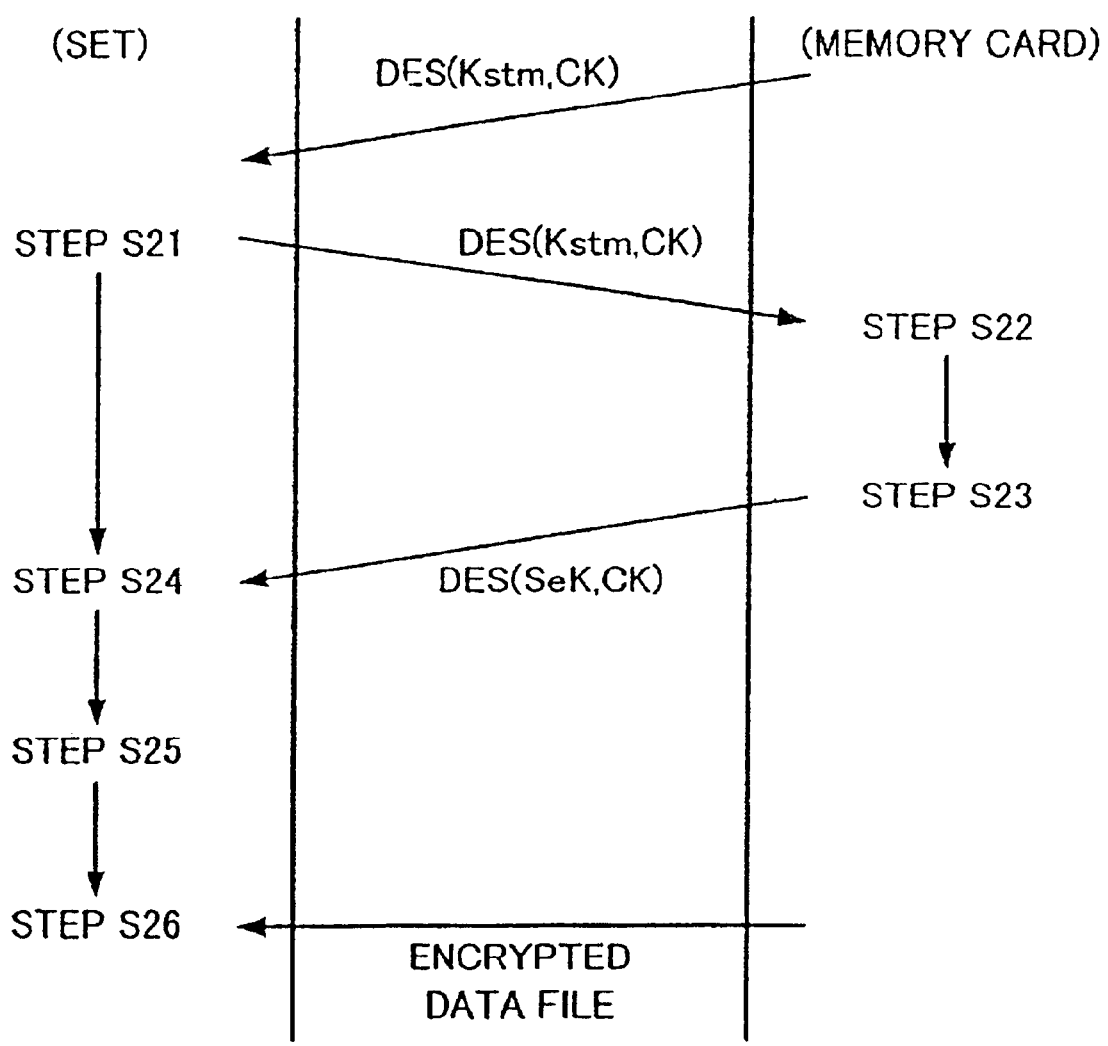
FIG. 13 is a diagram to which reference will be made in explaining an encrypting process in a reproducing operation.

FIG. 13 shows the decrypting process when recorder/player 1 reproduces an audio track stored in flash memory 42 of memory card 40. As with the write operation shown in FIGS. 9 to 11, the session key SeK is shared between recorder/player 1 and memory card 40 after they are mutually authenticated.

At step S21, recorder/player 1 (SET) reads data from memory card 40 (MEMORY CARD) and obtains the contents key CK encrypted with the storage key Kstm (namely, DES (Kstm, CK)) and encrypted contents (part data area(s) 102 of the desired track). Thereafter, recorder/player 1 sends the contents key CK encrypted with the storage key Kstm to memory card 40.

At step S22, memory card 40 decrypts the contents key CK with the storage key Kstm (namely, IDES (Kstm, DES (Kstm, CK)). At step S23, memory card 40 encrypts the decrypted contents key with the session key SeK and sends DES (SeK, CK) to recorder/player 1.

At step S24, recorder/player 1 decrypts the contents key with the session key SeK. At step S25, recorder/player 1 creates a block key BK with the decrypted contents key CK, a part key PK, and a block seed BK_SEED. At step S26, recorder/player 1 decrypts each encrypted part data area 102 with the block key BK block by block. The audio encoder/decoder 7 decodes the decrypted audio data.

Figure 14:
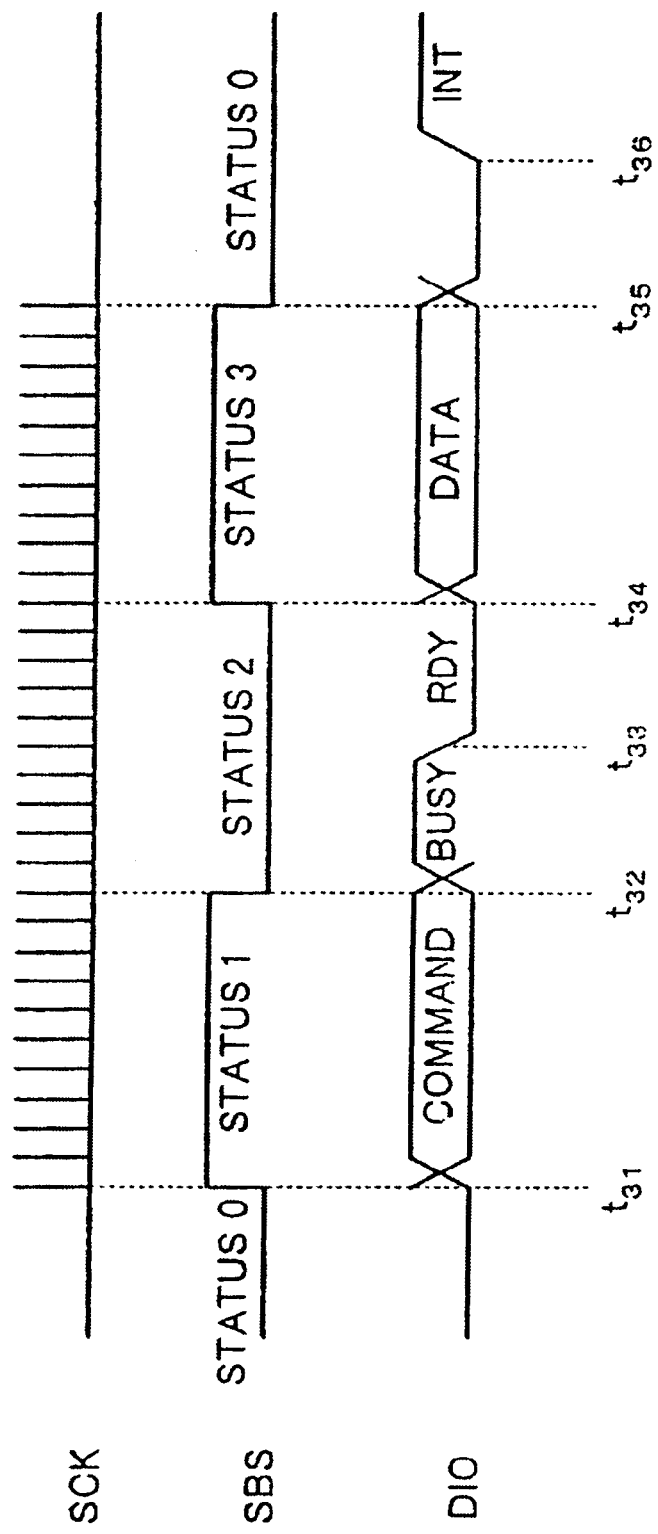
FIG. 14 is a diagram to which reference will be made in explaining an operation of an interface disposed between the recorder and the memory card.

With reference to interface 11 shown in FIG. 2, FIG. 14 shows a timing chart of data being read from memory card 40. In other than state 0 (initial state), a clock signal used to synchronize data is sent through clock line SCK. When data is sent or received between recorder/player 1 and memory card 40, the signal level of status line SBS is low. An initial condition may be referred to as state or status 0 (initial state). At timing t31, recorder/player 1 causes the signal level of status line SBS to become high (state 1).

When the signal level of status line SBS becomes high, memory card 40 (S/P and P/S IF block 43) determines that state 0 has changed to state 1. In state 1, recorder/player 1 sends a read command to memory card 40 through data line DIO. Thus, memory card 40 receives the read command. The read command is a protocol command referred to as a Transfer Protocol Command ("TPC"). As will be described later, the protocol command designates the contents of the communication and the length of data that follows.

At timing t32, after a command has been transmitted, the signal level of status line SBS changes from high to low. Thus, state 1 changes to state 2. In state 2, a process designated by a command received by memory card 40 is performed. In reality, data of an address designated by the read command is read from flash memory 42 to page buffer 45. While the process is being performed, a busy signal (high level) is sent to recorder/player 1 through data line DIO.

At timing t33, after data has been read from flash memory 42 to page buffer 45, the supplying of the busy signal is stopped. A ready signal (low level) that represents that memory card 40 is ready to send data in accordance with the read command is outputted to recorder/player 1.

When recorder/player 1 receives the ready signal from memory card 40, recorder/player 1 determines that memory card 40 is ready for processing the read command. At timing t34, recorder/player 1 causes the signal level of status line SBS to become high. In other words, state 2 changes to state 3.

In state 3, memory card 40 outputs data that has been read to page buffer 45 in state 2 to recorder/player 1 through data line DIO. At timing t35, after the read data has been sent, recorder/player 1 stops sending the clock signal through clock line SCK. In addition, recorder/player 1 causes the signal level of status line SBS to change from high to low. Thus, state 3 changes to the initial state (state 0).

When an interrupt process should be performed such as due to a state change in memory card 40 as at timing t36, memory card 40 sends an interrupt signal to recorder/player 1 through data line DIO. When recorder/player 1 receives the interrupt signal through data line DIO from memory card 40 in state 0, recorder/player 1 determines that the signal is an interrupt signal and performs a process corresponding to the interrupt signal.

Figure 15:
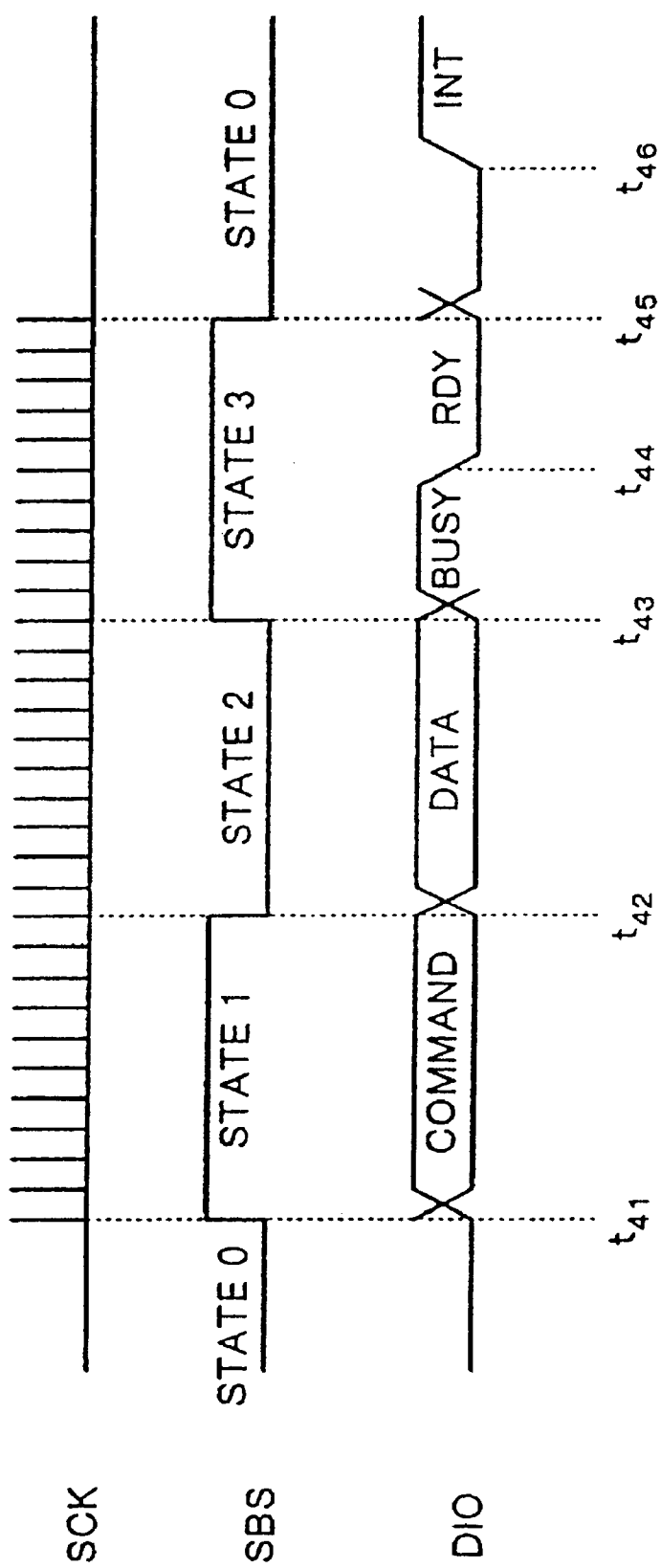
FIG. 15 is a diagram to which reference will be made in explaining an operation of an interface disposed between the recorder and the memory card.

FIG. 15 is a timing chart of an operation in which data is written to flash memory 42 of memory card 40. In the initial state (state 0), the clock signal is not sent through clock line SCK. At timing t41, recorder/player 1 causes the signal level of status line SBS to change from low to high. Thus, state 0 changes to state 1. In state 1, memory card 40 is ready to receive a command. At timing t41, a write command is sent to memory card 40 through data line DIO and memory card 40 receives the write command.

At timing t42, recorder/player 1 causes the signal level of status line SBS to change from high to low. Thus, state 1 changes to state 2. In state 2, recorder/player 1 sends write data to memory card 40 through data line DIO and memory card 40 stores the received write data to page buffer 45.

At timing t43, recorder/player 1 causes the signal level of status line SBS to change from low to high. Thus, state 2 changes to state 3. In state 3, memory card 40 writes the write data to flash memory 42, memory card 40 sends a busy signal (high level) to recorder/player 1 through data line DIO, and recorder/player 1 sends a write command to memory card 40. Since the current state is state 3, recorder/player 1 determines that the signal received from memory card 40 is a status signal.

At timing t44, memory card 40 stops outputting the busy signal and sends a ready signal (low level) to recorder/player 1. When recorder/player 1 receives the ready signal, recorder/player 1 determines that the writing process corresponding to the write command has been completed and stops sending the clock signal. Additionally at timing t45, recorder/player 1 causes the signal level of status line SBS to change from high to low. Thus, state 3 returns to state 0 (initial state).

When recorder/player 1 receives a high level signal from memory card 40 through data line DIO in state 0, recorder/player 1 determines that the received signal is an interrupt signal. Recorder/player 1 performs a process corresponding to the received interrupt signal. When memory card 40 is to be detached from recorder/player 1, memory card 40 generates the interrupt signal.

In other than the reading process and the writing process, in state 1, a command is sent. In state 2, data corresponding to the command is sent.

It is noted that the serial interface disposed between recorder/player 1 and memory card 40 is not limited to interface 11 as above described. In other words, various types of serial interface may be used.

Figure 16:
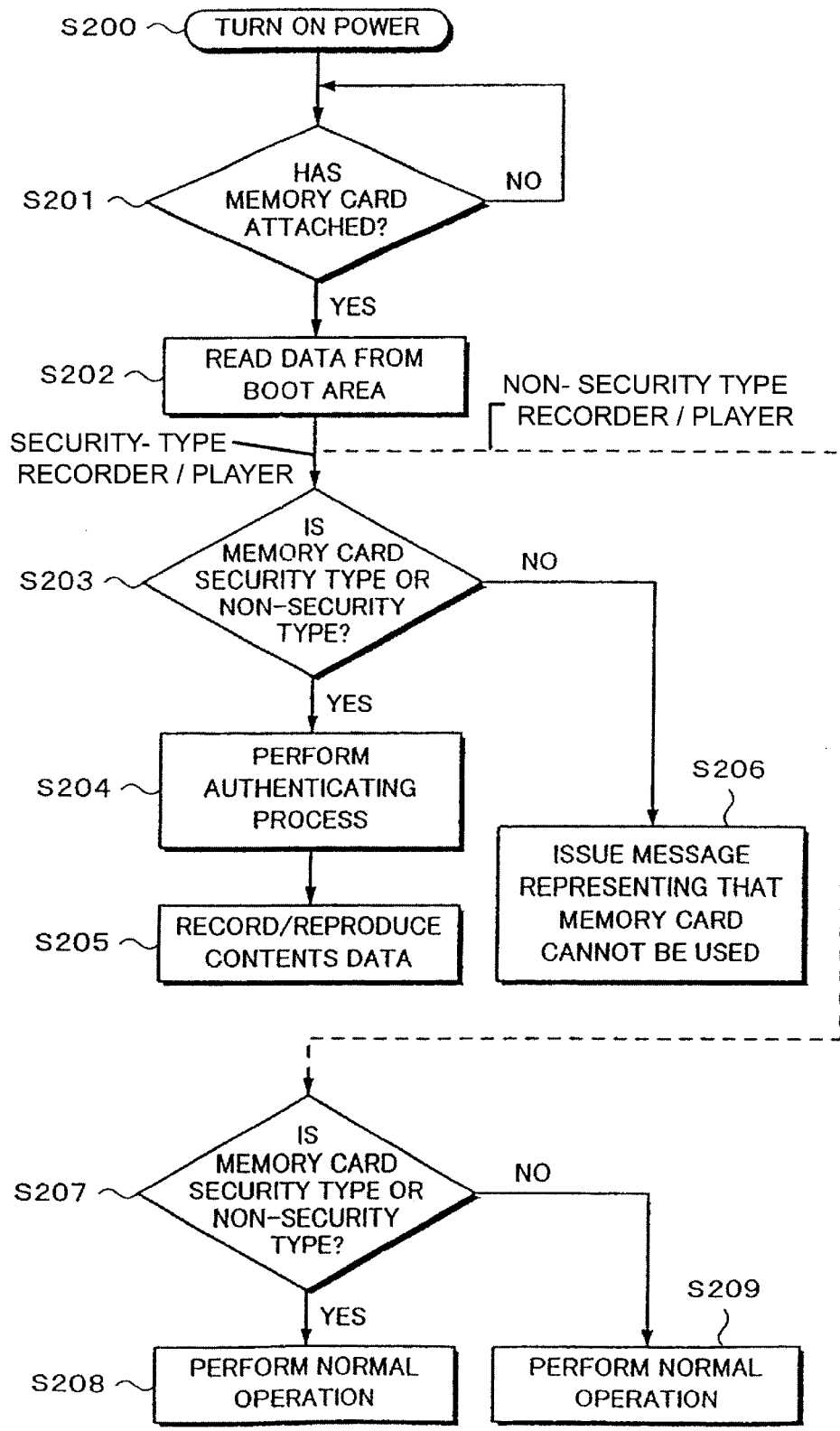
FIG. 16 is a flowchart to which reference will be made in explaining an operation of the present invention.

Next, a process performed by recorder/player 1 that uses a memory card will be described with reference to FIG. 16. When the power of recorder/player 1 is turned on (at step S200), it is determined whether or not memory card 40 or 40' has been attached to recorder/player 1 (at step S201). When the determined result at step S201 is Yes, data is read from a boot block of memory card 40 or 40' (at step S202).

As was described with reference to FIG. 7, boot and attribute information of a boot block contains identification information that represents whether or not memory card 40 or 40' is of the security type. With reference to the identification information, it is determined whether memory card 40 or 40' is a security type memory card (40) or a non-security type memory card (40') (at step S203). If the determined result at step S203 is Yes (memory card 40), an authenticating operation is performed (at step S204). After memory card 40 has been authenticated, contents data is recorded to memory card 40 or reproduced therefrom (at step S205).

If the determined result at step S203 is No (memory card 40'), an alarm message that represents memory card 40' cannot be used is displayed on display device 5. The alarm message may be issued with another method such as a sound.

The above-described process is performed by security type recorder/player 1. When the recorder/player 1 is not of the security type, the flow advances to step S207 from step S202 (where data is read from a boot block) as denoted by a dotted line shown in FIG. 16. At step S207, it is determined whether memory card 40 or 40' is a security type memory card (40) or a non-security type memory card (40'). Regardless of whether the determined result at step S207 is Yes or No, at step S208 or S209, a normal operation (writing operation, reading operation, erasing operation, or the like) can be performed for memory card 40 or 40'.

According to the above-described embodiment, the predetermined function of memory card 40 is a security function. However, it should be noted that the present invention is not limited to a security function. For example, the present invention can be applied for the communication speed or data rate of interface 11 disposed between recorder/player 1 and memory card 40 or 40'. In this case the communication speed of memory card 40 is faster than the conventional speed of memory card 40' and so memory card 40 is a high speed type (or high speed communication rate type) memory card and memory card 40' is a low speed type or (low speed communication rate type) memory card. Similarly, recorder/player 1 can be a high speed type recorder/player (e.g., faster than conventional speed) or a low speed type recorder player (e.g., conventional speed).

Figure 17:
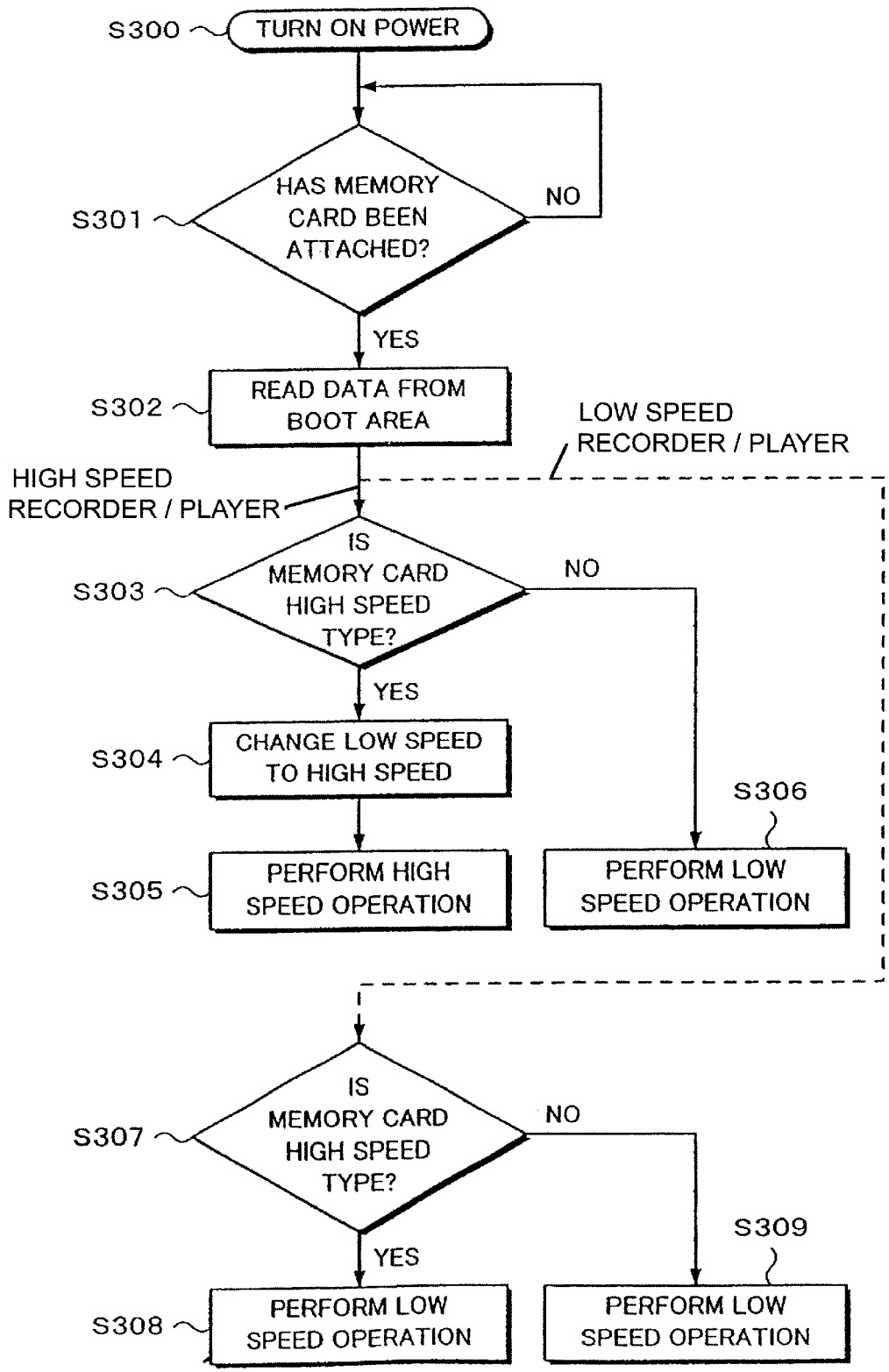
FIG. 17 is a flowchart to which reference will be made in explaining an operation of the present invention.

FIG. 17 is a flow chart showing a process with respect to communication speed as a predetermined function of memory card 40. At step S300, the power is turned on. At step S301, it is determined whether or not memory card 40 or 40' has been attached. At step S302, data is read from a boot block of memory card 40 or 40'. As with the security function, the boot block contains identification information that represents whether or not memory card 40 or 40' is of the high speed type.

It is determined whether or not memory card 40 or 40' is of the high speed type with the identification information (at step S303). When the determined result at step S303 is Yes (memory card 40), the communication speed (data rate) between recorder/player 1 and memory card 40 is changed from low speed to high speed (at step S304). Thus, high-speed operation is performed (at step S305). When the determined result at step S303 is No (memory card 40'), low speed operation is performed (at step S306). When recorder/player 1 is not of the high speed type, the flow advances to step S307 from step S302 (where data is read from a boot block) as denoted by a dotted line shown in FIG. 17. At step S307, it is determined whether memory card 40 or 40' is a high speed type memory card (40) or a low speed type memory card (40'). Regardless of whether the determined result at step S307 is Yes or No, low speed operation is performed at step S308 or S309.

According to the present invention, even if memory card 40 with a predetermined function and memory card 40' without a predetermined function co-exist, when memory card 40 or 40' is attached, recorder/player 1 can immediately determine whether or not memory card 40 or 40' has the predetermined function. Thus, unlike a method for communicating recorder/player 1 with memory card 40 or 40' to determine whether an error takes place, a meaningless operation is not performed. In addition, unlike a method for determining whether memory card 40 or 40' is of the predetermined function type by the shape thereof, memory card 40 with the predetermined function can be used for recorder/player 1 even if it does not have the predetermined function. Thus, the compatibility of the memory cards is improved.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

For example, the described embodiment employs DES as the security method. However, various encrypting technologies may be used instead of DES.

It is also to be understood that the following claims are intended to cover all of the generic and specific features of the invention herein described and all statements of the scope of the invention which, as a matter of language, might be said to fall therebetween.

What is claimed is:

1. A memory unit attachable to a data processing unit and detachable therefrom, said memory unit comprising:
a non-volatile memory; and
interface means for communicating with the data processing unit;
wherein identification information indicating at least one of (i) whether the memory unit is of a security type or a non-security type and (ii) whether the memory unit is of a first rate type in which data is recorded in the memory unit at a first rate or a second rate type in which data is recorded in the memory unit at a second rate, the first rate being different from the second rate, is recorded in a predetermined area of the non-volatile memory, and
wherein the identification information is read by the data processing unit when the memory unit is attached thereto.

2. A data processing unit for recording/reproducing data to/from a memory unit, the memory unit having a non-volatile memory and being attachable to/detachable from the data processing unit, the data processing unit comprising:

interface means for communicating with the memory unit; and means for determining at least one of (i) whether the memory unit is of a security type or a non-security type and (ii) whether the memory unit is of a first rate type in which data is recorded in the memory unit at a first rate or a second rate type in which data is recorded in the memory unit at a second rate, the first rate being different from the second rate when the memory unit is attached thereto;

wherein the determining means includes means for reading identification information from the memory unit indicating at least one of (i) whether the memory unit is of the security type or the non-security type and (ii) whether the memory unit is of the first rate type or the second rate type.

3. The data processing unit as set forth in claim 2, wherein the data processing unit performs a recording/reproducing operation after the determining means determines that the memory unit is of the security type and after performing an authenticating operation with the memory unit.

4. The data processing unit as set forth in claim 2, wherein the data processing unit is one of a security type and a non-security type, and wherein the data processing unit prohibits a recording/reproducing operation after determining that the memory unit is of the non-security type when the data processing unit is of the security type.

5. The data processing unit as set forth in claim 2, wherein the data processing unit is one of a security type and a non-security type, and wherein the data processing unit outputs an error message after determining that the memory unit is of the non-security type when the data processing unit is of the security type.

6. The data processing unit as set forth in claim 2, wherein the data processing unit communicates with the memory unit at the appropriate one of the first and second rates as determined by the determining means.

7. The data processing unit as set forth in claim 2, wherein the identification information is recorded in a predetermined area of the non-volatile memory, and wherein the reading means reads the identification information from the predetermined area of the non-volatile memory when the memory unit is attached to the data processing unit.

8. A data processing method for use with a data processing unit for writing/reading information to/from a memory unit having a non-volatile memory that is attachable to the data processing unit and detachable therefrom, the data processing method comprising the steps of:

reading data from a predetermined storage area of the non-volatile memory of the memory unit when the memory unit is attached to the data processing unit, wherein the data includes identification information indicating at least one of (i) whether the memory unit is of the security type or the non-security type and (ii) whether the memory unit is of the first rate type or the second rate type; and determining at least one of (i) whether the memory unit is of a security type or a non-security type and (ii) whether the memory unit is of a first rate type in which data is recorded in the memory unit at a first rate or a second rate type in which data is recorded in the memory unit at a second rate, the first rate being different from the second rate.

9. The data processing method as set forth in claim 8, further comprising the step of writing/reading data to/from the memory unit after determining that the memory unit is of the security type and after performing an authenticating operation with the memory unit.

10. The data processing method as set forth in claim 8, wherein the data processing unit is one of a security type and a non-security type, further comprising the step of prohibiting writing/reading data to/from the memory unit after determining that the memory unit is of the non-security type when the data processing unit is of the security type.

11. The data processing method as set forth in claim 8, wherein the data processing unit is one of a security type and a non-security type, further comprising the step of outputting an error message after determining that the memory unit is of the non-security type when the data processing unit is of the security type.

12. The data processing method as set forth in claim 8, wherein the data processing unit communicates with the memory unit at the appropriate one of the first and second rates as determined at the determining step.

13. A data processing unit for recording/reproducing data to/from a memory unit, the memory unit having a non-volatile memory and being attachable to/detachable from the data processing unit, the data processing unit comprising:

interface means for communicating with the memory unit; and means for determining whether the memory unit is of a first rate type in which data is recorded in the memory unit at a first rate or a second rate type in which data is recorded in the memory unit at a second rate, the first rate being different from the second rate when the memory unit is attached thereto.

14. The data processing unit as set forth in claim 13, further comprising means for determining whether the memory unit is of a security type or a non-security type.

15. The data processing unit as set forth in claim 13, wherein the data processing unit communicates with the memory unit at the appropriate one of the first and second rates as determined by the determining means.

* * * * *